(12) United States Patent
Peng et al.

(10) Patent No.: US 8,307,049 B2
(45) Date of Patent: Nov. 6, 2012

(54) METHOD AND DEVICE FOR OBTAINING MEDIA DESCRIPTION INFORMATION OF IPTV SERVICES

(75) Inventors: Zhaojun Peng, Shenzhen (CN); Jun Yan, Shenzhen (CN); Jincheng Li, Shenzhen (CN); Feng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 12/693,071

(22) Filed: Jan. 25, 2010

(65) Prior Publication Data

US 2010/0121963 A1 May 13, 2010

Related U.S. Application Data

(63) Continuation of application No. PCT/CN2008/072776, filed on Oct. 21, 2008.

(30) Foreign Application Priority Data

Oct. 22, 2007 (CN) .......................... 2007 1 0181370
Dec. 12, 2007 (CN) .......................... 2007 1 0195706
Apr. 3, 2008 (CN) .......................... 2008 1 0091604

(51) Int. Cl.
*G06F 15/16* (2006.01)
(52) U.S. Cl. ...................................................... 709/219
(58) Field of Classification Search .................. 709/228, 709/230, 219
See application file for complete search history.

(56) References Cited

U.S. PATENT DOCUMENTS

2006/0239247 A1* 10/2006 Postmus ........................ 370/352
2007/0115389 A1* 5/2007 McCarthy et al. ............ 348/461
2007/0201441 A1* 8/2007 Buckley .......................... 370/356
2007/0220553 A1 9/2007 Branam et al.
2008/0127255 A1* 5/2008 Ress et al. ........................ 725/38
2008/0141306 A1* 6/2008 Foti .................................. 725/44
2008/0288458 A1 11/2008 Sun et al.
2008/0307108 A1 12/2008 Yan et al.
2009/0193469 A1 7/2009 Igarashi
2009/0217337 A1 8/2009 Astrom
2009/0235299 A1* 9/2009 Astrom et al. .................. 725/25

FOREIGN PATENT DOCUMENTS

| CN | 1816053 A | 8/2006 |
| CN | 1852319 A | 10/2006 |
| CN | 1946162 A | 4/2007 |
| CN | 1964474 A | 5/2007 |

(Continued)

OTHER PUBLICATIONS

First Office Action of corresponding Chinese Patent Application No. 200810091608.4, mailed Nov. 10, 2010, and partial English translation thereof, 9 pages total.

(Continued)

*Primary Examiner* — Jason Recek

(57) ABSTRACT

A method and device for obtaining media description information of Internet Protocol Television (IPTV) services are provided. The method includes: receiving, by a network device, a Session Initiation Protocol (SIP) request for obtaining media description information, where the SIP request is sent by a User Equipment (UE) through a core IP Multimedia Subsystem (IMS) and carries a content identifier; sending, by the network device, a SIP response that carries the media description information corresponding to the content identifier to the UE through the core IMS. According to the present disclosure, a SIP message is used to obtain media description information, so that a session of the Content on Demand (CoD) service is set up.

16 Claims, 10 Drawing Sheets

FOREIGN PATENT DOCUMENTS

| | | |
|---|---|---|
| CN | 101021853 A | 8/2007 |
| CN | 101026682 A | 8/2007 |
| CN | 101035251 A | 9/2007 |
| CN | 101039329 A | 9/2007 |
| CN | 101052044 A | 10/2007 |
| JP | 2009527154 A | 7/2009 |
| WO | 2007047036 A2 | 4/2007 |
| WO | 2007067176 A2 | 6/2007 |
| WO | 2007093126 A1 | 8/2007 |
| WO | 2007096001 A1 | 8/2007 |
| WO | 2007101473 A1 | 9/2007 |
| WO | 2007102547 A1 | 9/2007 |

OTHER PUBLICATIONS

Second Office Action of corresponding Chinese Patent Application No. 200810091608.4, mailed Jul. 6, 2011, and partial English translation thereof, 7 pages total.

Cover page of granted corresponding Chinese Patent No. 10459664 B (Application No. 200810091604.6) citing prior art at item (56), issued Oct. 20, 2011, 1 page only.

First Office Action of corresponding Japanese Patent Application No. 2010-530255, mailed Nov. 15, 2011, and English translation thereof, 6 pages total.

Written Opinion and International Search Report of corresponding PCT Patent Application No. PCT/CN2008/072775, mailed Feb. 12, 2009, 7 pages total.

Written opinion of corresponding PCT Patent Application No. PCT/CN2008/072776, mailed Feb. 5, 2009, 6 pages total.

Extended Search report of corresponding European Patent Application No. 08844274.4, mailed Jun. 10, 2010, 7 pages total.

ETSI, draft ETSI TS 182 027 V0.0.15 Technical Specification: Telecommunications and Internet converged Services and Protocols for Advanced Networking (TISPAN); IPTV Architecture; IPTV functions supported by the IMS subsystem, dated Sep. 2007, 65 pages total.

ETSI, ETSI TS 183 063 V0.0.3 ETSI Standard: Telecommunications and Internet Converged Services and Protocols for Advanced Networking (TISPAN); IMS based IPTV Stage 3 Specification, dated May 2007, 27 pages total.

3GPP, 3GPP TS 23.228 V7.2.0 Technical Specification: 3rd Generation Partnership Project; Technical Specification Group Services and System Aspects; IP Multimedia Subsystem (IMS); Stage 2 (Release 7), dated Dec. 2005, 192 pages total.

First Office Action of corresponding European Patent Application No. 08844274.4, mailed on Aug. 9, 2012, 6 pages total.

* cited by examiner

METHOD AND DEVICE FOR OBTAINING MEDIA DESCRIPTION INFORMATION OF IPTV SERVICES

This application is a continuation of International Patent Application No. PCT/CN2008/072776, filed Oct. 21, 2008, which claims the benefit of Chinese Patent Applications No. 200710181370.X filed on Oct. 22, 2007, No. 200710195706.8 filed on Dec. 12, 2007 and No. 200810091604.6 filed on Apr. 3, 2008, all of which are hereby incorporated by reference in their entireties.

FIELD OF THE DISCLOSURE

The present disclosure relates to communication technologies, and in particular, to a method and device for obtaining media description information of Internet Protocol Television (IPTV) services.

BACKGROUND OF THE DISCLOSURE

An IP Multimedia Subsystem (IMS) is a subsystem in an existing Packet Switched (PS) domain on a Wideband Code Division Multiple Access (WCDMA) network added in the 3rd Generation Partnership Project (3GPP) R5 standard. The IMS uses a PS domain as a bearer channel for upper-layer control signaling and media delivery, introduces the Session Initiation Protocol (SIP) as a service control protocol, and provides plentiful multimedia services by using the features of SIP, such as simplicity, extensibility, and convenient media combination and by separating service control from bearer control. The international standardization organizations that participate in IMS standardization include the 3GPP and the Telecommunications and Internet converged Services and Protocol for Advanced Networking (TISPAN). The 3GPP researches the IMS from the perspective of mobile access. The TISPAN raises requirements for the IMS from the perspective of fixed access and then the IMS is perfected by the 3GPP. Finally, unified control is implemented for fixed access and mobile access over the IMS.

IMS based IPTV provides IPTV services in the entire IMS architecture proposed by the TISPAN so as to fully use the existing mechanisms such as registration, authentication, routing, session control and setup, service triggering, charging, and end-to-end Quality of Service (QoS) to provide streaming services and multimedia services that integrate streaming services and real-time session services for users. That is, a multimedia session from users to contents is completed by an existing session control mechanism of the IMS. During session setup, bearer resources need to be reserved for transmission of media streams.

In the prior art, main features of session setup in a Content on Demand (CoD) service process are as follows: In the CoD service process, users may perform VCR control, such as forward, rewind, and pause for watched contents; therefore, a media control channel used for VCR operations and a media delivery channel used for transmitting watched contents need to be established for the service. According to different modes of establishing a media control channel and a media delivery channel, the CoD service process defined by the TISPAN includes two modes. In the first mode, a media control channel and a media delivery channel are established during SIP session setup at the same time. In the second mode, a media control channel is established during initial session setup, and then a media delivery channel is established through a session change.

The prerequisite to the use of the first mode is that a User Equipment (UE) has obtained media information of watched contents from an Electronic Program Guide (EPG), such as the media lines, for example, audio, video, and text media lines, of the contents. Therefore, the media delivery channel may be negotiated and established. If the second mode is adopted, a media control channel (generally an RTSP channel) is negotiated and established through a SIP session setup process; a media exchange control session is set up between a UE and a Media Function (MF); the network parameter information of media is obtained by exchanging media control messages; and then a content delivery channel is established during a session change.

In fact, compared with the first mode, the second mode has the following defect: Session setup takes a long time. The general process is as follows: After a session is set up initially (by using a SIP message), the UE and the network (MF) initiate a media control message (generally an RTSP DESCRIBE message) to set up a media control session, and exchange media contents in a media control session message, and finally, a media channel is established through a session change process (by using a SIP message). As a result, user service experience is poor. Therefore, the restriction on the application of the second mode in current specifications is as follows: establishing a content delivery channel during an initial session, namely, the second mode, is optional only when a network provides only network parameter information of a media control channel rather than the network parameter information of a content delivery channel for users.

During the implementation of the present disclosure, the inventor discovers at least the following problems in the prior art:

If the second mode is adopted, more interactions are required between the UE and the network; more requirements are raised for the UE; session setup is delayed; and user experience becomes poor.

SUMMARY OF THE DISCLOSURE

Embodiments of the present disclosure provide a method and device for obtaining media description information of IPTV services so as to obtain media description information through a SIP message to set up a session of the CoD service.

A method for obtaining media description information of IPTV services includes:

receiving, by a network device, a SIP request for obtaining media description information, where the SIP request is sent by a UE through a core IMS and carries a content identifier; and sending, by the network device, a SIP response that carries the media description information corresponding to the content identifier to the UE through the core IMS.

A network device includes:

a receiving unit, configured to receive a SIP request for obtaining media description information, where the SIP request is sent by a UE through a core IMS and carries a content identifier;

a generating unit, configured to generate a response in which Session Description Protocol (SDP) carries the media description information corresponding to the content identifier; and a sending unit, configured to send the response to the UE through the core IMS.

A media control and negotiation method includes:

receiving, by a network device, control mode information sent by a UE; and returning, by the network device, control mode information to the UE, where the control mode information is carried in a SIP header field or SDP attribute line of a message body.

In embodiments of the present disclosure, a UE may obtain information such as control parameters, network parameters, and content media descriptions from related entities such as a Service Control Function (SCF) or an MF, and then perform corresponding operations according to these parameters.

DETAILED DESCRIPTION OF THE EMBODIMENTS

Figure 1:
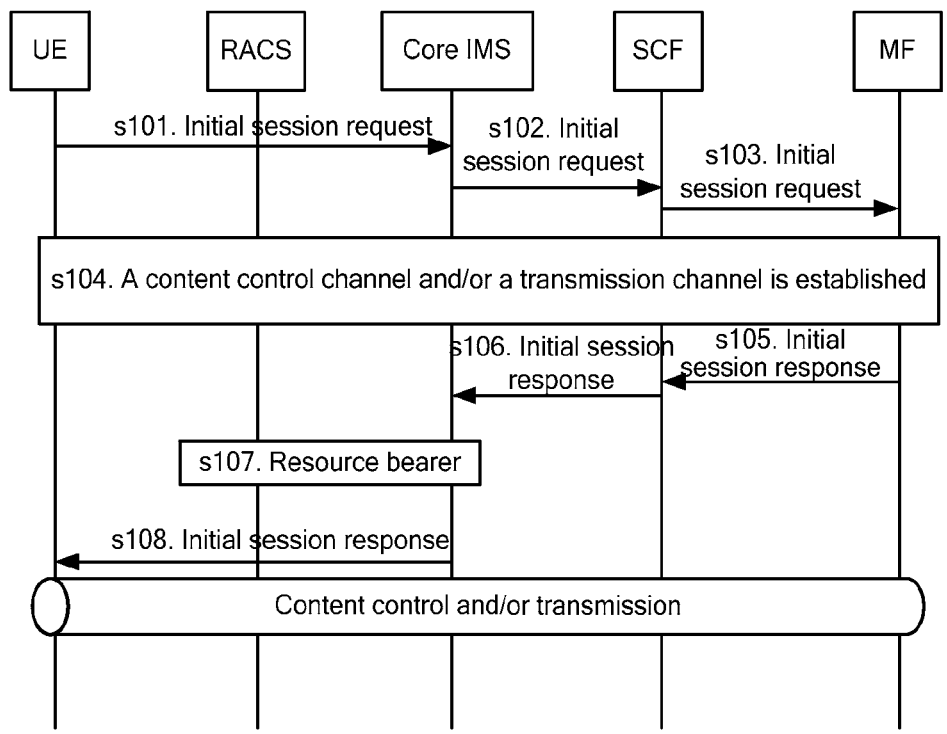
FIG. 1 is a flowchart of describing a CoD service in a prior art.

In the prior art, the Real Time Streaming Protocol (RTSP)-based session negotiation and setup process well supports the foregoing operation modes; for example, if an aggregation mode is created, all media delivery channels may be controlled synchronously; or if a separate mode is adopted, each media delivery channel may be controlled separately.

In the CoD service of the IMS, parameters related to an RTSP session are negotiated during SIP session setup. The RTSP session setup process, such as a Setup message of RTSP, does not exist; instead, an RTSP message is used to perform VCR operation control after a SIP session is set up. The related RTSP parameters are carried and negotiated in a SIP/SDP message, and therefore, in the IMS-based IPTV service environment, the SIP/SDP message may not indicate VCR operations for one or more media delivery channels of contents in the CoD service (that is, when a UE performs VCR operations through an RTSP message, VCR operations may not be performed for one or more media channels of contents); that is, the SIP/SDP message in the prior art may not transfer the information to the UE.

The first embodiment of the present disclosure provides a method for media control indication. The method is to indicate the control state of each media stream through attribute lines specified in SDP; that is, SDP identifies synchronous control, separate control or hybrid control (coexistence of synchronous control and separate control) for multiple media delivery channels. Synchronous control is to control multiple media streams at the same time and separate control is to control a single media stream. Attributes may be represented in multiple modes. The following provides several examples to describe these modes.

In all the following embodiments, the media streams corresponding to media delivery channels that are associated with attribute lines need to be controlled by corresponding media control channels; the media streams corresponding to media delivery channels that are not associated with attribute lines are not controlled by corresponding media control channels.

The first mode uses attribute lines to describe a relation between a media delivery channel and a media control channel, namely, a relation of corresponding description information in SDP.

The first mode uses an attribute line "a=<attribute>: <value>", where "attribute" identifies a media control attribute, such as RTSP session control, which may be a character set or others; "value" identifies information about a media control channel, which may be a character set (RTSP URL or others) or a number (RTSP session identifier or others).

The attribute line may be placed before a first media line "m=" to serve as a session-level attribute so as to describe media control channels that control all media delivery channels.

The attribute line may be placed after a media line "m=" to serve as a media-level attribute so as to describe a media control channel that controls a media delivery channel.

The attribute lines in the following embodiments take "a=control:<RTSP URL>" as an example. Other description modes may also be adopted.

Example 1 of session-level attribute lines is as follows:

```
a=control: rtsp://foo/twister
m=audio 1306 RTP/AVP 0//Describe a media line of an audio media
 delivery channel
m=video 1308 RTP/AVP 26//Describe a media line of a video media
 delivery channel
m=application 9 TCP iptv_rtsp//Describe a media line of a media
 control channel
a=fmtp:rtsp h-uri= rtsp://foo/twister
```

The "a=control:" attribute line serves as a session-level attribute, which indicates synchronous control for the media streams corresponding to an audio media delivery channel and a video media delivery channel; the media control information indicates description information of the media control channel corresponding to an RTSP URL of "rtsp://foo/twister" in the attribute line, and the description information includes but is not limited to one or more of: a media line, an attribute line, an RTSP session attribute line, and an attribute line of an RTSP media stream identifier. "m=" is a media line, and <RTSP URL> may be "rtsp://foo/twister" but, in practice, the specific forms are not limited to this.

Example 2 of media-level attribute lines is as follows:

```
m=audio 1306 RTP/AVP 0//Describe a media line of an audio media
delivery channel
a=control:rtsp://foo/twister
m=video 1308 RTP/AVP 26//Describe a media line of a video media
delivery channel
a=control:rtsp://foo/twister
m=text 1310 RTP/AVP wb//Describe a media line of a text media
delivery channel
m=application 9 TCP iptv_rtsp//Describe a media line of a media
control channel
a=fmtp:rtsp h-uri= rtsp://foo/twister
```

The "a=control:" attribute line serves as a media-level attribute, which indicates that the media control information corresponding to an audio media delivery channel and a video media delivery channel is the description information of the media control channel corresponding to an RTSP URL of "rtsp://foo/twister" in the attribute line, and the description information includes but is not limited to one or more of: a media line, an attribute line, an RTSP session attribute line, and an attribute line of an RTSP media stream identifier. A text media delivery channel does not have a corresponding "a=control:" attribute line, which indicates that there is no corresponding media control channel for control; "m=" is a media line, and <RTSP URL> may be "rtsp://foo/twister" but, in practice, the specific forms are not limited to this.

Example 3 of media-level attribute lines is as follows:

```
m=audio 1306 RTP/AVP 0//Describe a media line of an audio media
delivery channel
a=control:rtsp://foo/twister/audio
m=video 1308 RTP/AVP 26//Describe a media line of a video media
delivery channel
a=control:rtsp://foo/twister/ video
m=application 9 TCP iptv_rtsp//Describe a media line of a media
control channel
a=fmtp:rtsp h-uri= rtsp://foo/twister/audio
m=application 11 TCP iptv_rtsp//Describe a media line of a media
control channel
a=fmtp:rtsp h-uri= rtsp://foo/twister/video
```

"m=audio" is an audio media line, and "a=control:rtsp://foo/twister/audio" is an attribute line for separately controlling the audio media streams corresponding to the audio media line; "m=video" is a video media line, and "control:rtsp://foo/twister/video" is an attribute line for separately controlling the video media streams corresponding to the video media line. The media control information corresponding to an audio media delivery channel indicates the description information of the media control channel corresponding to an RTSP URL of "rtsp://foo/twister/audio" in its attribute line and the media control information corresponding to a video media delivery channel indicates the description information of the media control channel corresponding to an RTSP URL of "rtsp://foo/twister/video" in its attribute line, and the description information includes but is not limited to one or more of: a media line, an attribute line, an RTSP session attribute line, and an attribute line of an RTSP media stream identifier. The descriptions of the "a=" and "m=" lines are only examples, and are not intended to limit the specific forms.

In addition, in this mode, although the UE may control each medium separately and synchronous control is not forced, multiple media may be controlled synchronously during actual applications; for example, multiple control messages are sent at the same time, and each control message controls one media channel so as to control all media streams synchronously.

The second mode uses group attribute lines to describe a relation between a media delivery channel and a media control channel, namely, a relation of corresponding description information in SDP.

The second mode uses a group attribute line "a=group: semantics*(spaceidentification-tag)".

"semantics" identifies a media control attribute, which may be a character set or others; "identification-tag" indicates a media stream identifier, which may be a number, a token or others. The group attribute line indicates that media streams whose identifiers are "identification-tag" are controlled by a unified media control channel. The media stream identifier is a stream identifier value in the "a=mid:" stream identifier attribute line or a stream label value in the "a=label:" stream label attribute line.

Example 4 is as follows:

```
a=group:<control attribute (control) stream identifier (1 2)>
a=control:rtsp://foo/twister
m=audio 1306 RTP/AVP 0
a=mid:1
m=video 1308 RTP/AVP 26
a=mid:2
m=text 1310 RTP/AVP wb
a=control:rtsp://foo/twister/text
m=application 9 TCP iptv_rtsp//Describe a media line of a media
control channel
a=fmtp:rtsp h-uri= rtsp://foo/twister
m=application 9 TCP iptv_rtsp//Describe a media line of a media
control channel
a=fmtp:rtsp h-uri= rtsp://foo/twister/text
```

"a=group:<control attribute (control) stream identifier (1 2)>" is a group attribute line, which indicates synchronous control for the audio media streams corresponding to the media stream identifier 1 and the video media streams corresponding to the media stream identifier 2; "a=control:rtsp://foo/twister" further indicates that the media control information corresponding to two media delivery channels is the description information of the media control channel corresponding to an RTSP URL of "rtsp://foo/twister" in the attribute line, and the description information includes but is not limited to one or more of: a media line, an attribute line, an RTSP session attribute line, and an attribute line of an RTSP media stream identifier. The text media streams corresponding to the "m=text 1310 RTP/AVP wb" media line are controlled separately, and the media control information indicates the description information of the media control channel corresponding to an RTSP URL of "rtsp://foo/twister/text". The descriptions of the "a=" and "m=" lines are only examples, and are not intended to limit the specific forms.

Example 5 is as follows:

```
a=group:<control attribute (control) label identifier (1)>
a=control:rtsp://foo/twister
m=audio 1306 RTP/AVP 0
a=label: 1
m=video 1308 RTP/AVP 26
a=label: 1
m=text 1310 RTP/AVP wb
a=control:rtsp://foo/twister/text
m=application 9 TCP iptv_rtsp//Describe a media line of a media
```

-continued

```
control channel
a=fmtp:rtsp h-uri= rtsp://foo/twister
m=application 9 TCP iptv_rtsp//Describe a media line of a media
control channel
a=fmtp:rtsp h-uri= rtsp://foo/twister/text
```

"a=group:<control attribute (control) label identifier (1)>" is a group attribute line, which indicates synchronous control for the audio media streams and video media streams corresponding to label identifier 1; "a=control:rtsp://foo/twister" further indicates that the media control information corresponding to two media delivery channels is the description information of the media control channel corresponding to an RTSP URL of "rtsp://foo/twister" in the attribute line, and the description information includes but is not limited to one or more of: a media line, an attribute line, an RTSP session attribute line, and an attribute line of an RTSP media stream identifier. Text media streams may be controlled separately, and the media control information indicates the description information of the media control channel corresponding to an RTSP URL of "rtsp://foo/twister/text". The description of the "a=" line is only an example, and is not intended to limit the specific forms.

Example 6 is as follows:

```
a=group:rtspcontrol 1 2
m=audio 1306 RTP/AVP 0//Describe a media line of a media delivery
channel.
a=mid:1
m=video 1308 RTP/AVP 26// Describe a media line of a media delivery
channel.
a=mid:2
m=text 1310 RTP/AVP wb
a=mid:3
m=application 9 TCP iptv_rtsp//Describe a media line of a media control
channel
a=mid:4
```

"a=group:rtspcontrol 1 2" is a group attribute line, which indicates synchronous control for the audio media streams corresponding to the media stream identifier 1 and the video media streams corresponding to the media stream identifier 2; the media control channel information indicates the media description information corresponding to a media control channel, and the description information includes but is not limited to one or more of: a media line, an attribute line, an RTSP session attribute line, and an attribute line of an RTSP media stream identifier. There is no media control channel to control media streams for the text media streams corresponding to the media stream identifier 4. The descriptions of the "a=" and "m=" lines are only examples, and are not intended to limit the specific forms.

The mode in which a media stream identifier adopts an "a=label:" stream label attribute line is similar to the mode in example 6. The difference is that the "a=mid:" attribute line in example 6 is replaced with the "a=label:" attribute line, and that a media stream identifier in the group attribute line is changed to a label value in the "a=label:" attribute line.

The second mode may also use a group attribute line "a=group:semantics*(space identification-tag)".

"semantics" identifies a media control attribute, which may be a character set or others; "identification-tag" identifies information about a media control channel and information about a media stream identifier. The information about a media control channel may be a character set or a number; the character set may be an RTSP URL or others, and the number may be an RTSP session identifier, an RTSP media control stream identifier or others; the RTSP media control stream identifier and the media stream identifier may be a number, a token or others. The RTSP media control stream identifier and the media stream identifier are stream identifier values in the "a=mid:" stream identifier attribute line or stream label values in the "a=label:" stream label attribute line.

Example 7 is as follows:

```
a=group:control rtsp://foo/twister 1 2
m=audio 1306 RTP/AVP 0
a=mid:1
m=video 1308 RTP/AVP 26
a=mid:2
m=application 9 TCP iptv_rtsp//Describe a media line of a media control
channel
a=mid:3
a=fmtp:rtsp h-uri= rtsp://foo/twister
```

"a=group:control rtsp://foo/twister 1 2" is a group attribute line, which indicates synchronous control for the audio media streams corresponding to the media stream identifier 1 and the video media streams corresponding to the media stream identifier 2; the media control information indicates the description information of the media control channel corresponding to an RTSP URL of "rtsp://foo/twister", and the description information includes but is not limited to one or more of: a media line, an attribute line, an RTSP session attribute line, and an attribute line of an RTSP media stream identifier. The descriptions of the "a=" and "m=" lines are only examples, and are not intended to limit the specific forms.

Example 8 is as follows:

```
a=group:rtspcontrol 3 1 2
m=audio 1306 RTP/AVP 0//Describe a media line of an audio media
delivery channel
a=mid:1
m=video 1308 RTP/AVP 26//Describe a media line of a video media
delivery channel
a=mid:2
m=application 9 TCP iptv_rtsp//Describe a media line of a media control
channel
a=mid:3
```

"a=group:rtspcontrol 3 1 2" is a group attribute line, which indicates synchronous control for the audio media streams corresponding to the media stream identifier 1 and the video media streams corresponding to the media stream identifier 2; the media control information indicates the media description information corresponding to the media stream identifier 3, and the description information includes but is not limited to one or more of: a media line, an attribute line, an RTSP session attribute line, and an attribute line of an RTSP media stream identifier. The descriptions of the "a=" and "m=" lines are only examples, and are not intended to limit the specific forms.

The mode in which a media stream identifier adopts an "a=label:" stream label attribute line is similar to the mode in example 8. The difference is that the "a=mid:" attribute line in example 8 is replaced with the "a=label:" attribute line, and that a media stream identifier in the group attribute line is changed to a label value in the "a=label:" attribute line.

The second mode may also use a group attribute line "a=group:semantics*(space identification-tag)", "semantics" identifies information about a media control channel, which may be a character set (an RTSP URL or others) or a number (an RTSP session identifier, an RTSP media control stream identifier or others).

"identification-tag" indicates a media stream identifier, which may be a number, a token or others. The group attribute line indicates that media streams whose identifiers are "identification-tag" are controlled by a unified media control channel. The media stream identifier is a stream identifier value in the "a=mid:" stream identifier attribute line or a stream label value in the "a=label:" stream label attribute line.

Example 9 is as follows:

```
a=group:rtsp://foo/twister 1 2
m=audio 1306 RTP/AVP 0
a=mid:1
m=video 1308 RTP/AVP 26
a=mid:2
m=application 9 TCP iptv_rtsp//Describe a media line of a media control channel
a=mid:3
a=fmtp:rtsp h-uri= rtsp://foo/twister
```

"a=group:rtsp://foo/twister 1 2" is a group attribute line, which indicates synchronous control for the audio media streams corresponding to the media stream identifier 1 and the video media streams corresponding to the media stream identifier 2; the media control information indicates the description information of the media control channel corresponding to an RTSP URL of "rtsp://foo/twister", and the description information includes but is not limited to one or more of: a media line, an attribute line, an RTSP session attribute line, and an attribute line of an RTSP media stream identifier. The descriptions of the "a=" and "m=" lines are only examples, and are not intended to limit the specific forms.

The mode in which a media stream identifier adopts an "a=label:" stream label attribute line is similar to the mode in example 9. The difference is that the "a=mid:" attribute line in example 9 is replaced with the "a=label:" attribute line, and that a media stream identifier in the group attribute line is changed to a label value in the "a=label:" attribute line.

The third mode uses attribute lines to describe a relation between the media streams corresponding to a media line of a media delivery channel and a corresponding media control channel, namely, a relation of corresponding description information in SDP.

The third mode uses an attribute line "a=<attribute>:<value>", where, "attribute" identifies a media control attribute, which may be a character set or others; "value" identifies information about a media control channel and information about a media stream identifier. The information about a media control channel may be a character set or a number; the character set may be an RTSP URL or others, and the number may be an RTSP session identifier, an RTSP media control stream identifier or others; the RTSP media control stream identifier and the media stream identifier may be a number, a token or others. The RTSP media control stream identifier and the media stream identifier are stream identifier values in the "a=mid:" stream identifier attribute line or stream label values in the "a=label:" stream label attribute line.

Example 10 is as follows:

```
A=rtspcontrol:rtsp://foo/twister 1 2
m=audio 1306 RTP/AVP 0
a=mid:1
m=video 1308 RTP/AVP 26
a=mid:2
m=application 9 TCP iptv_rtsp//Describe a media line of a media control channel
a=mid:3
a=fmtp:rtsp h-uri= rtsp://foo/twister
```

"a=rtspcontrol:rtsp://foo/twister 1 2" indicates synchronous control for the audio media streams corresponding to the media stream identifier 1 and the video media streams corresponding to the media stream identifier 2; the media control information indicates the description information of the media control channel corresponding to an RTSP URL of "rtsp://foo/twister", and the description information includes but is not limited to one or more of: a media line, an attribute line, an RTSP session attribute line, and an attribute line of an RTSP media stream identifier. The description of the "a=" line is only an example, and is not intended to limit the specific forms.

Example 11 is as follows:

```
A=rtspcontrol:rtsp://foo/twister 1
m=audio 1306 RTP/AVP 0
a=label:1
m=video 1308 RTP/AVP 26
a=label:1
m=application 9 TCP iptv_rtsp//Describe a media line of a media control channel
a=fmtp:rtsp h-uri= rtsp://foo/twister
```

"a=rtspcontrol:rtsp://foo/twister 1" indicates synchronous control for the audio media streams and video media streams corresponding to the media stream label identifier 1; the media control information indicates the description information of the media control channel corresponding to an RTSP URL of "rtsp://foo/twister", and the description information includes but is not limited to one or more of: a media line, an attribute line, an RTSP session attribute line, and an attribute line of an RTSP media stream identifier. The description of the "a=" line is only an example, and is not intended to limit the specific forms.

The fourth mode uses attribute lines to describe a relation between the media streams corresponding to a media line of a media delivery channel and a corresponding media control channel, namely, a relation of corresponding description information in SDP.

The fourth mode uses an attribute line "a=<attribute>:<value>", where, "attribute" identifies a media control attribute, which may be a character set or others; "value" identifies identifier information of a controlled media stream. The information about a media stream identifier may be a number, a token or others. The media stream identifier is a stream identifier value in the "a=mid:" stream identifier attribute line or a stream label value in the "a=label:" stream label attribute line.

Example 12 is as follows:

```
m=audio 1306 RTP/AVP 0//Describe a media line of an audio deliver channel.
a=label: 1
```

```
m=video 1308 RTP/AVP 26//Describe a media line of a video delivery
channel
a=label: 1
m=application 9 TCP iptv_rtsp//Describe a media line of a media control
channel
a=rtspcontrol: 1
```

"a=rtspcontrol:1" indicates that the media streams with the label identifier 1 are controlled by the corresponding media control channel; the "a=label:1" label attribute line indicates that the audio label identifier and the video label identifier are both 1, and that audio and video media streams are controlled synchronously; the media control information indicates the description information of a media control channel, and the description information includes but is not limited to one or more of: a media line, an attribute line, an RTSP session attribute line, and an attribute line of an RTSP media stream identifier. The description of the "a=" line is only an example, and is not intended to limit the specific forms. During the actual extension, characters other than "rtspcontrol" may be used.

Example 13 is as follows:

```
m=audio 1306 RTP/AVP 0//Describe a media line of an audio deliver
channel.
a=mid: 1
m=video 1308 RTP/AVP 26//Describe a media line of a video delivery
channel
a=mid: 2
m=application 9 TCP iptv_rtsp//Describe a media line of a media control
channel
a=rtspcontrol: 1 2
```

"a=rtspcontrol:1 2" indicates that the media streams with the stream identifiers 1 and 2 are controlled by the corresponding media control channels; the "a=mid:" attribute line indicates that the audio stream identifier and the video stream identifier are 1 and 2 respectively, and that audio and video media streams are controlled synchronously; the media control information indicates the description information of a media control channel, and the description information includes but is not limited to one or more of: a media line, an attribute line, an RTSP session attribute line, and an attribute line of an RTSP media stream identifier. The description of the "a=" line is only an example, and is not intended to limit the specific forms. During the actual extension, characters other than "rtspcontrol" may be used.

If media lines of multiple media control channels (such as RTSP) and media lines of multiple media delivery channels (such as RTP) are available, different media control channels (such as RTSP) are instructed to control different media by matching different media stream identifiers in attribute lines (such as "a=rtspcontrol:") under media lines of multiple media control channels (such as RTSP) and stream label values in the "a=label:" attribute lines or stream identifier values in the "a=mid:" attribute lines under media lines of media delivery channels (such as RTP); for example, one media control channel (such as RTSP) controls audio media and another media control channel (such as RTSP) controls video media and text media.

The fifth mode uses attribute lines under media lines of a media control channel (such as RTSP) to describe a relation between the media streams corresponding to a media line of a media delivery channel and a corresponding media control channel, namely, a relation of corresponding description information in SDP.

The fifth mode uses an attribute line "a=<attribute>:<value>", where, "attribute" identifies a media control attribute, which may be a character set or others; "value" identifies information about a media control channel and information about a media stream identifier. The information about a media control channel may be a character set or a number; the character set may be an RTSP URL or others, and the number may be an RTSP session identifier, an RTSP media control stream identifier or others; the RTSP media control stream identifier and the media stream identifier may be a number, a token or others. The RTSP media control stream identifier and the media stream identifier are stream identifier values in the "a=mid:" stream identifier attribute line or stream label values in the "a=label:" stream label attribute line.

Example 14 is as follows:

```
m=audio 1306 RTP/AVP 0
a=mid:1
m=video 1308 RTP/AVP 26
a=mid:2
m=application 9 TCP iptv_rtsp//Describe a media line of a media
control channel
A=rtspcontrol:rtsp://foo/twister 1 2
```

"a=rtspcontrol:rtsp://foo/twister 1 2" indicates that the media streams with the stream identifiers 1 and 2 are controlled by the media control channel corresponding to the "a=rtspcontrol" attribute line; the attribute line with an RTSP URL of "rtsp://foo/twister,a=mid:" indicates that the audio stream identifier and the video stream identifier are 1 and 2 respectively, and that audio and video media streams are controlled synchronously; the media control information indicates the description information of a media control channel, and the description information includes but is not limited to one or more of: a media line, an attribute line, an RTSP session attribute line, and an attribute line of an RTSP media stream identifier. The description of the "a=" line is only an example, and is not intended to limit the specific forms. During the actual extension, characters other than "rtspcontrol" may be used.

Example 15 is as follows:

```
m=audio 1306 RTP/AVP 0
a=label:1
m=video 1308 RTP/AVP 26
a=label:1
m=application 9 TCP iptv_rtsp//Describe a media line of a media
control channel
a=rtspcontrol:rtsp://foo/twister 1
```

"a=rtspcontrol:rtsp://foo/twister 1" indicates that the media streams with the label identifier 1 are controlled by the media control channel corresponding to the "a=rtspcontrol" attribute line; the attribute line with an RTSP URL of "rtsp://foo/twister,a=label:" indicates that the audio label identifier and the video label identifier are both 1, and that audio and video media streams are controlled synchronously; the media control information indicates the description information of a media control channel, and the description information includes but is not limited to one or more of: a media line, an attribute line, an RTSP session attribute line, and an attribute line of an RTSP media stream identifier. The description of the "a=" line is only an example, and is not intended to limit the specific forms. During the actual extension, characters other than "rtspcontrol" may be used.

If media lines of multiple media control channels, such as RTSP, and media lines of multiple media delivery channels, such as RTP, are available, different media control channels, such as RTSP, are instructed to control different media by matching different media stream identifiers in attribute lines, such as "a=rtspcontrol:", under media lines of multiple media control channels, such as RTSP, and stream label values in the "a=label:" attribute lines or stream identifier values in the "a=mid:" attribute lines under media lines of media delivery channels, such as RTP; for example, one media control channel, such as RTSP, controls audio media and another media control channel, such as RTSP, controls video media and text media.

The foregoing embodiments take an attribute line carrying an RTSP URL as an example. Actually, an attribute line may also carry a SIP URI, a TV URI or any identifier that may identify media contents.

In this embodiment, attribute lines are used to indicate media delivery channels, such as RTP, controlled by media control channels, such as RTSP. The implementation mode is more flexible. That is, the attribute lines may be used to indicate one or more media delivery channels controlled in the case of one media control channel, or one or more media channels controlled by each media control channel in the case of multiple media control channels.

Figure 2:
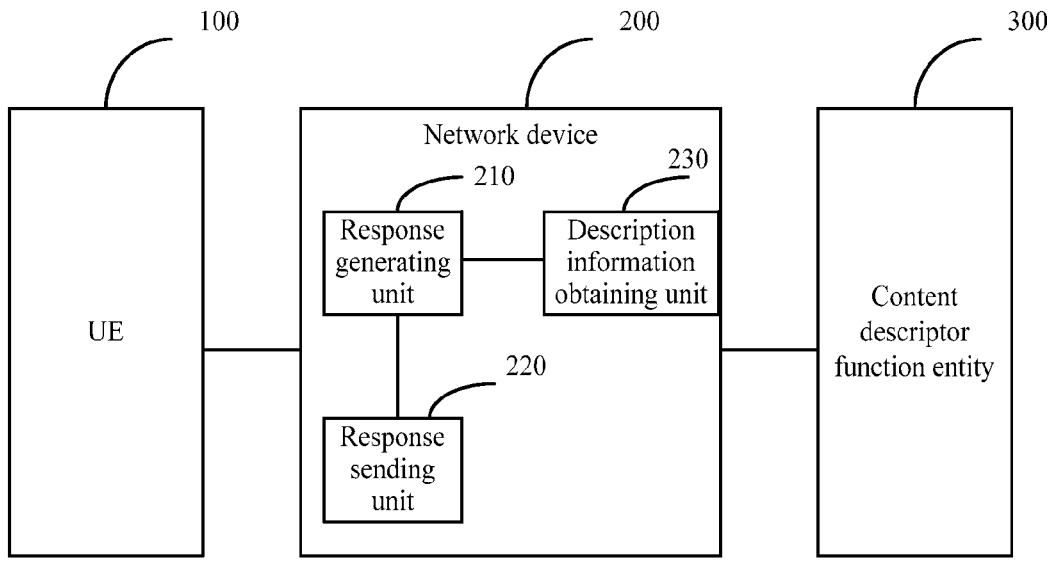
FIG. 2 is a structure of a system for obtaining media description information in a second embodiment of the present disclosure.

The second embodiment of the present disclosure provides a system for obtaining media control session information. As shown in FIG. 2, the system includes:

a UE 100, configured to send a request carrying a content identifier to a network device 200 through a core IMS;

the network device 200, configured to send an attribute line of a media control group that carries the media control session information corresponding to the content identifier to the UE 100 through the core IMS after receiving the request that is sent by the UE 100 through the core IMS; and a content descriptor function entity 300, configured to provide media control session information for the network device 200.

An embodiment of the present disclosure provides a network device. The network device includes:

a response generating unit 210, configured to generate a response with an attribute line of a media control group carrying different media control session information;

a response sending unit 220, configured to send the response to the UE through the core IMS; and a description information obtaining unit 230, configured to obtain the media control session information corresponding to a content identifier.

An embodiment of the present disclosure further provides a system for obtaining media control session information. The system includes:

a UE 100, configured to send a request carrying a content identifier to a network device 200 through a core IMS;

the network device 200, configured to send a media control attribute line (a=<attribute>:<value>) that carries the media control session information corresponding to the content identifier to the UE 100 through the core IMS after receiving the request that is sent by the UE 100 through the core IMS, where "attribute" identifies a media control attribute and "value" identifies a media stream identifier; and a content descriptor function entity 300, configured to provide media control session information for the network device 200.

An embodiment of the present disclosure further provides a network device. The network device includes:

a response generating unit 210, configured to generate a response with a media control attribute line (a=<attribute>: <value>) carrying media control session information, where "attribute" identifies a media control attribute and "value" identifies a media stream identifier;

a response sending unit 220, configured to send the response to the UE through the core IMS; and a description information obtaining unit 230, configured to obtain the media control session information corresponding to a content identifier.

Figure 3:
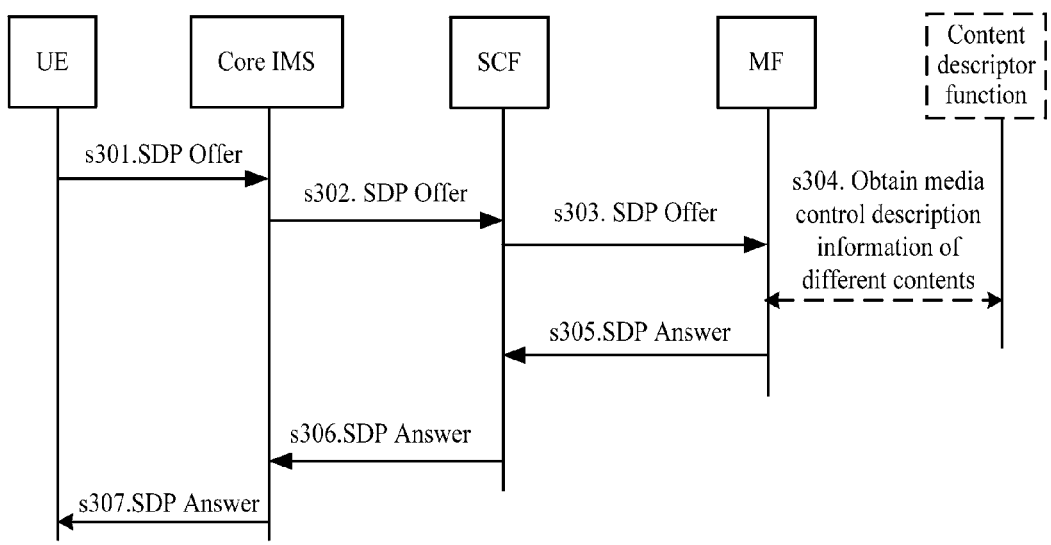
FIG. 3 is a flowchart of a method for obtaining media description information in a third embodiment of the present disclosure.

The method for obtaining media description information in the third embodiment of the present disclosure is as follows: A UE initiates a CoD service request, in which an SDP Offer carries information about negotiating a media control channel and a media delivery channel, and an MF returns an SDP Answer to the UE after obtaining control descriptions of different media components of the same content from a content descriptor function entity. As shown in FIG. 3, the process includes the following steps:

Step S301: A UE initiates a CoD service request that carries a content identifier and an SDP Offer to a core IMS. The service request may be a SIP INVITE message or other requests.

Step S302: The core IMS forwards the CoD service request to an SCF.

Step S303: The SCF selects a proper MF according to the content identifier, and then sends the SDP Offer to the MF.

Step S304: The MF obtains control description information of different media components of the same content corresponding to the content identifier from the content descriptor function, such as a synchronous control mode, a separate control mode or a hybrid control mode adopted by multiple media streams corresponding to one content. The content descriptor function may work as an internal function module of the MF or an independent function entity. This step is optional.

Steps S305-S307: According to the control description information of different media components of the same content, the MF generates a corresponding SDP Answer that contains attribute lines, such as the information described in the first embodiment, for indicating control session information of each media stream; the MF returns the SDP Answer to the UE through a service response that may be a 200 OK, a 183 request or others.

Figure 4:
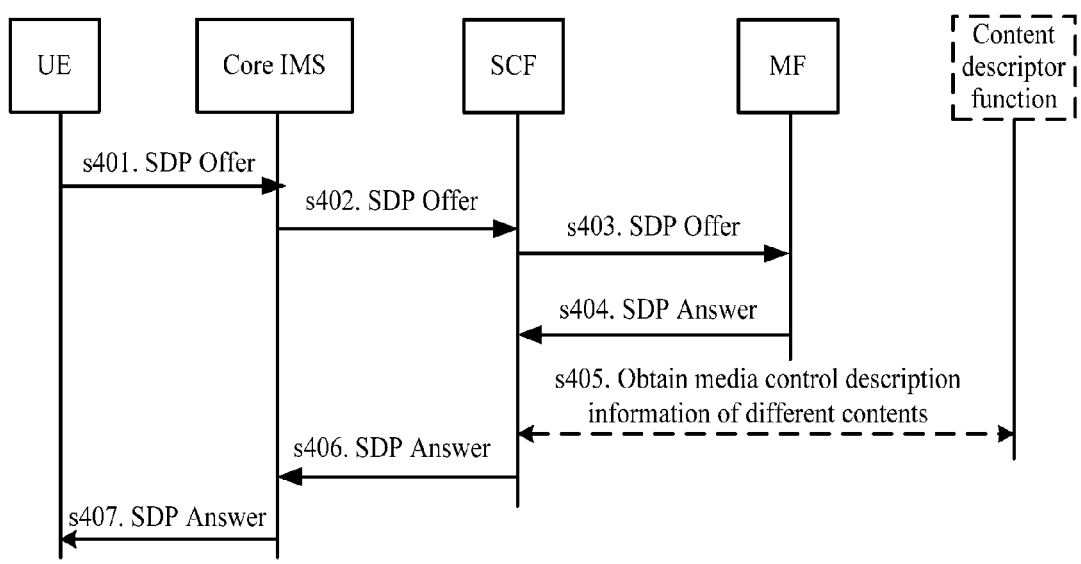
FIG. 4 is a flowchart of a method for obtaining media description information in a fourth embodiment of the present disclosure.

The method for obtaining media description information in the fourth embodiment of the present disclosure is as follows: A UE initiates a CoD service request, in which an SDP Offer carries information about negotiating a media control channel and a media delivery channel, and an SCF returns an SDP Answer to the UE after obtaining control descriptions of different media components of the same content from a content descriptor function entity. As shown in FIG. 4, the process includes the following steps:

Steps S401-S402: A UE initiates a CoD service request that carries a content identifier and an SDP Offer to an SCF through a core IMS. The service request may be a SIP INVITE message or other requests.

Step S403: The SCF selects a proper MF according to the content identifier, and then sends the SDP Offer to the MF.

Step S404: The MF returns an SDP Answer that carries description information of a content control channel and a content delivery channel to the SCF.

Step S405: The SCF obtains control description information of different media components of the same content corresponding to the content identifier from the content descriptor function, such as a synchronous control mode, a separate control mode or a hybrid control mode adopted by multiple media streams corresponding to one content. The content descriptor function may work as an internal function module of the SCF or an independent function entity. This step is optional.

Steps S406-S407: According to the control description information of different media components of the same content, the SCF generates a corresponding SDP Answer that contains attribute lines, such as the information described in the first embodiment, for indicating control session information of each media stream; the SCF returns the SDP Answer to the UE through a service response that may be a 200 OK, a 183 request or others.

Figure 5:
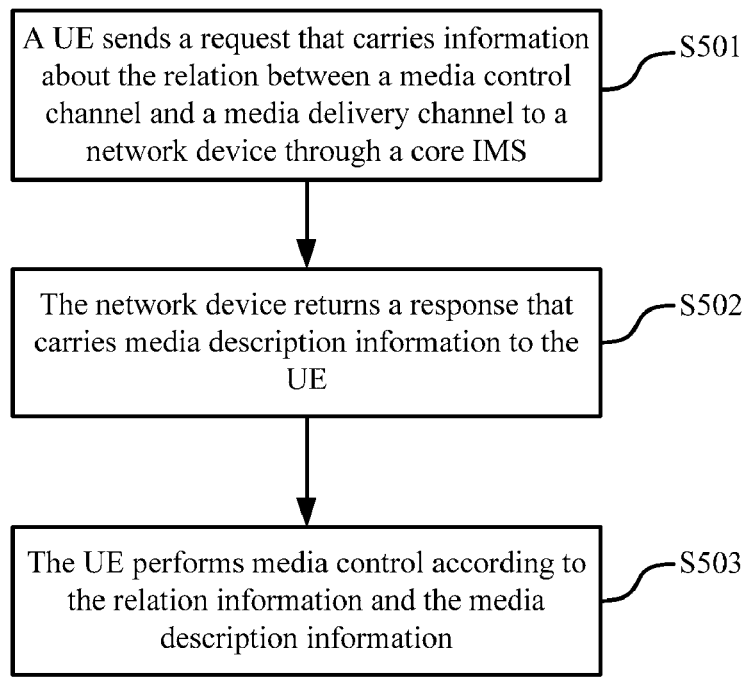
FIG. 5 is a flowchart of a method for implementing media control in a fifth embodiment of the present disclosure.

As shown in FIG. 5, the fifth embodiment of the present disclosure provides a method for implementing media control. The method includes the following steps:

Step S501: A UE sends a request that carries information about the relation between a media control channel and a media delivery channel to a network device through a core IMS.

The information about the relation between a media control channel and a media delivery channel may be obtained from a Service Selection Function (SSF), carried in an SDP attribute line of the request in the mode described in the first embodiment, and sent to the network device through the core IMS.

For easy description, the mode of carrying relation information in the request is exemplified below:

--- a=group:rtspcontrol 1 2
m=audio 1306 RTP/AVP 0//Describe a media line of a media delivery channel.
a=mid:1
m=video 1308 RTP/AVP 26// Describe a media line of a media delivery channel.
a=mid:2
m=text 1310 RTP/AVP wb
a=mid:3
m=application 9 TCP iptv_rtsp//Describe a media line of a media control channel
a=mid:4

---

"a=group:rtspcontrol 1 2" is a group attribute line, which indicates synchronous control for the audio media streams corresponding to the media stream identifier 1 and the video media streams corresponding to the media stream identifier 2; the media control channel information indicates the media description information corresponding to a media control channel, and the description information includes but is not limited to one or more of: a media line, an attribute line, an RTSP session attribute line, and an attribute line of an RTSP media stream identifier. There is no media control channel to control media streams for the text media streams corresponding to the media stream identifier 4. The descriptions of the "a=" and "m=" lines are only examples, and are not intended to limit the specific forms.

The mode in which a media stream identifier adopts an "a=label:" stream label attribute line is similar to the mode in example 6. The difference is that the "a=mid:" attribute line in example 6 is replaced with the "a=label:" attribute line, and that a media stream identifier in the group attribute line is changed to a label value in the "a=label:" attribute line.

The forgoing mode is just an exemplary embodiment of the present disclosure; for other modes, see the detailed descriptions in the first embodiment; a change of the mode does not affect the scope of protection of the present disclosure.

Step S502: The network device returns a response that carries media description information to the UE.

Specifically, the media description information is information about a media delivery channel and/or a media control channel, which may be carried in an SDP attribute line of the response.

Step S503: The UE performs media control according to the relation information and the media description information.

The network device in this embodiment is an SCF, an MF or other network entities that may implement the foregoing functions of the network device; the variation of specific entities does not affect the scope of protection of the present disclosure.

Figure 6:
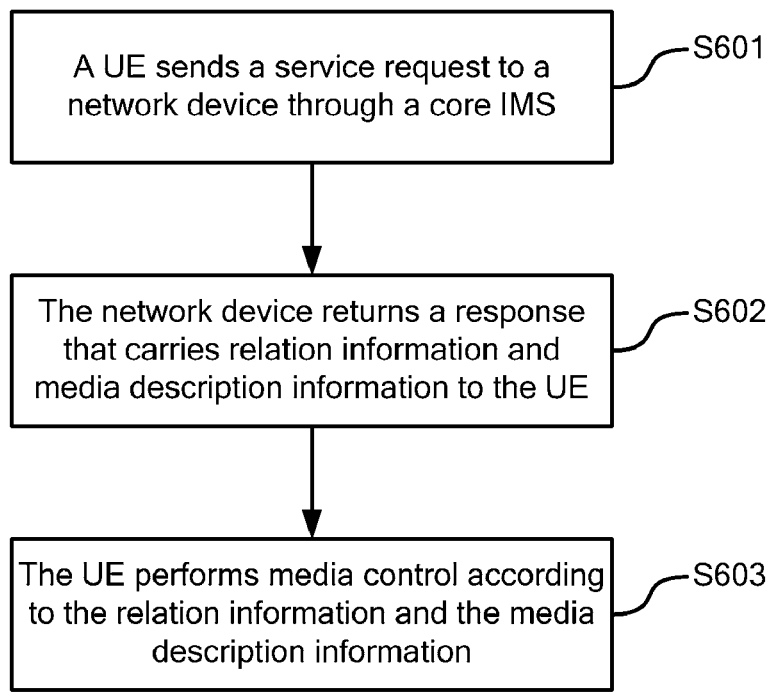
FIG. 6 is a flowchart of a method for implementing media control in a sixth embodiment of the present disclosure.

As shown in FIG. 6, the sixth embodiment of the present disclosure provides a method for implementing media control. The method includes the following steps:

Step S601: A UE sends a service request to a network device through a core IMS.

The UE initiates a CoD service request that carries a content identifier to a core IMS. The service request may be a SIP INVITE message or other requests.

Step S602: The network device returns a response that carries relation information and media description information to the UE.

The relation information indicates information about the relation between a media control channel and a media delivery channel, and is carried in an SDP attribute line of the response in the mode described in the first embodiment.

For easy description, the mode of carrying relation information in the request is exemplified below:

--- a=group:rtspcontrol 3 1 2
m=audio 1306 RTP/AVP 0//Describe a media line of an audio media delivery channel
a=mid:1
m=video 1308 RTP/AVP 26//Describe a media line of a video media delivery channel
a=mid:2
m=application 9 TCP iptv_rtsp//Describe a media line of a media control channel
a=mid:3

---

"a=group:rtspcontrol 3 1 2" is a group attribute line, which indicates synchronous control for the audio media streams corresponding to the media stream identifier 1 and the video media streams corresponding to the media stream identifier 2; the media control information indicates the media description information corresponding to the media stream identifier 3, and the description information includes but is not limited to one or more of: a media line, an attribute line, an RTSP session attribute line, and an attribute line of an RTSP media stream identifier. The descriptions of the "a=" and "m=" lines are only examples, and are not intended to limit the specific forms.

The mode in which a media stream identifier adopts an "a=label:" stream label attribute line is similar to the mode in example 8. The difference is that the "a=mid:" attribute line in example 8 is replaced with the "a=label:" attribute line, and that a media stream identifier in the group attribute line is changed to a label value in the "a=label:" attribute line.

The forgoing mode is merely an exemplary embodiment of the present disclosure; for other modes, see the detailed descriptions in the first embodiment; a change of the mode does not affect the scope of protection of the present disclosure.

Step S603: The UE performs media control according to the relation information and the media description information.

The network device in this embodiment is an SCF, an MF or other network entities that may implement the foregoing functions of the network device; the variation of specific entities does not affect the scope of protection of the present disclosure.

Figure 7:
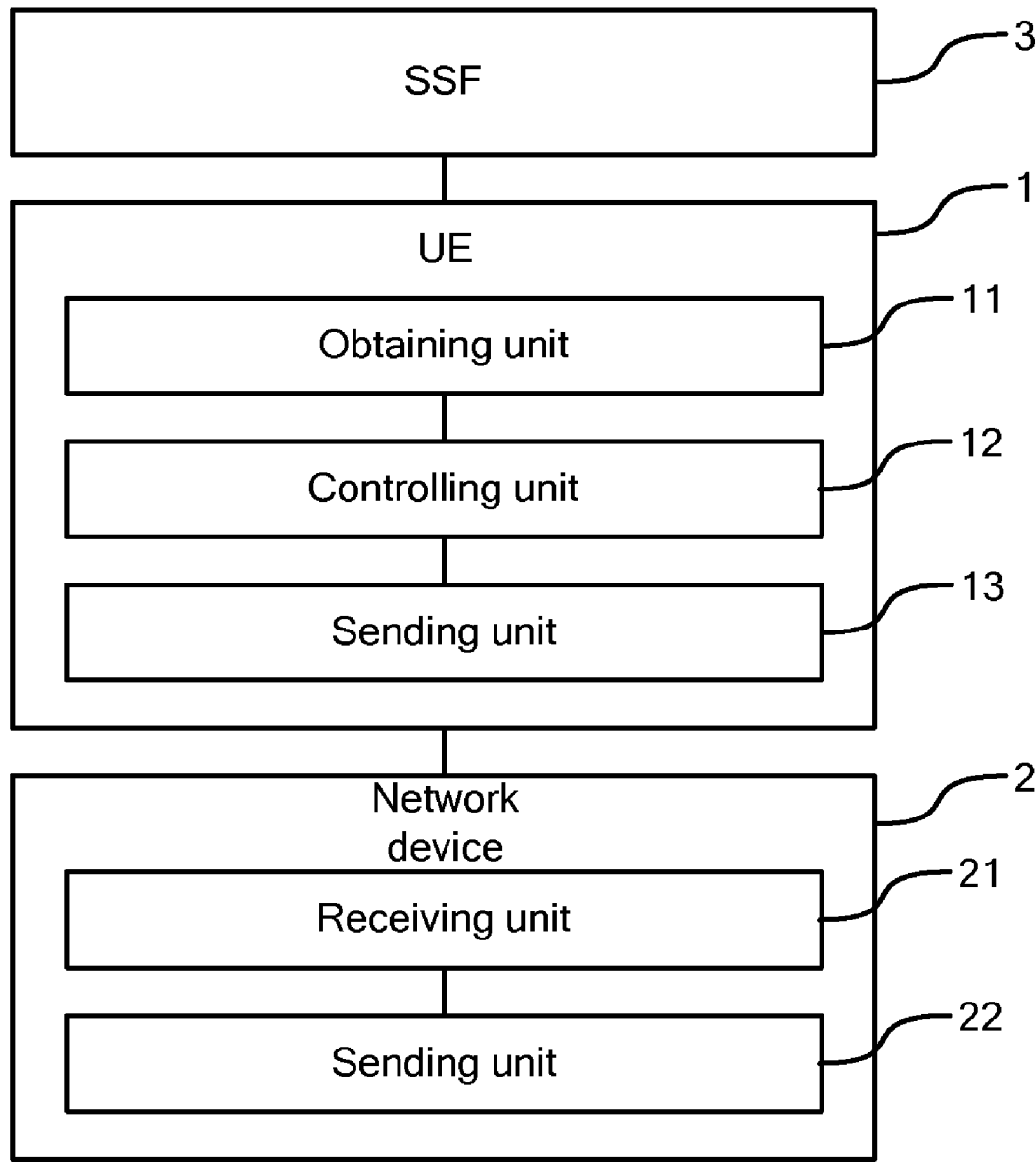
FIG. 7 is a structure of a system for implementing media control in a seventh embodiment of the present disclosure.

As shown in FIG. 7, the seventh embodiment of the present disclosure provides a system for implementing media control. The system includes a UE 1, configured to: obtain information about the relation between a media control channel and a media delivery channel and perform media control according to the relation information and media description information.

The UE 1 is further configured to send a request, in which SDP carries relation information, to a network device 2 through a core IMS.

Further, the system may also include a network device 2, configured to send a response, in which SDP carries information about the relation between a media control channel and a media delivery channel.

Further, the system may also include an SSF 3, configured to provide information about the relation between a media control channel and a media delivery channel to the UE 1. The SSF provides service selection information in the IMS-based IPTV architecture, such as an entity of EPG information.

In the foregoing embodiment of the system, the network device 2 may be an SCF, an MF or other entities.

An embodiment of the present disclosure further provides a UE 1. The UE 1 includes:

an obtaining unit 11, configured to obtain information about the relation between a media control channel and a media delivery channel; and a controlling unit 12, configured to perform media control according to relation information and media description information.

Further, the UE 1 may also include a sending unit 13, configured to send a request, in which SDP carries information about the relation between a media control channel and a media delivery channel.

An embodiment of the present disclosure further provides a network device 2. The network device 2 includes:

a receiving unit 21, configured to receive a request; and a sending unit 22, configured to send a response, in which SDP carries information about the relation between a media control channel and a media delivery channel.

Further, the SSF 3 is configured to provide service selection information such as an EPG.

In this embodiment, the network device 2 may be an SCF, an MF or other entities.

In embodiments of the present disclosure, attribute lines of a SIP/SDP message are used to describe a media delivery channel, such as RTP, controlled by a media control channel, such as RTSP, thus implementing synchronous VCR operations for all media delivery channels or VCR operations for a single media delivery channel of contents in the CoD service.

In the prior art, main features of session setup in a CoD service process are as follows: In the CoD service process, users may perform VCR control, such as forward, rewind, and pause for watched contents; therefore, a media control channel used for VCR operations and a media delivery channel used for transmitting watched contents need to be established for the service. According to different modes of establishing a media control channel and a media delivery channel, the CoD service process defined by the TISPAN includes two modes. In the first mode, a media control channel and a media delivery channel are established during SIP session setup at the same time. In the second mode, a media control channel is established during initial session setup, and then a media delivery channel is established through a session change.

The prerequisite to the use of the first mode is that a UE has obtained media information of watched contents from an Electronic Program Guide (EPG), such as the media lines, for example, audio, video, and text media lines, of the contents. Therefore, the media delivery channel may be negotiated and established. If the second mode is adopted, a media control channel (generally an RTSP channel) is negotiated and established through a SIP session setup process; a media exchange control session is set up between a UE and an MF; the network parameter information of media is obtained by exchanging media control messages; and then a content delivery channel is established during a session change.

In fact, compared with the first mode, the second mode has the following defect: Session setup takes a long time. The general process is as follows: After a session is set up initially (by using a SIP message), the UE and the network (MF) initiate a media control message (generally an RTSP DESCRIBE message) to set up a media control session, and exchange media contents in a media control session message, and finally, a media channel is established through a session change process (by using a SIP message). As a result, user service experiences are poor. Therefore, the restriction for the application of the second mode in current specifications is as follows: establishing a content delivery channel during initial session setup, namely, the second mode, is optional only when a network provides only network parameter information of a media control channel rather than network parameter information of a content delivery channel, for users. However, if the second mode is adopted, more interactions are required between the UE and the network; more requirements are raised for the UE; session setup is delayed; and user experience becomes poor.

Embodiments of the present disclosure use an OPTIONS method in a SIP session message to initiate a service request directly to obtain network parameters and/or media information of contents dynamically when network parameters or media information of contents may not be obtained from an SSF, for example, when a UE may not access the SSF which is equivalent to the function of an EPG, and adopts HTTP usually, or when the UE may access the SSF but the SSF does not provide required information, or when the UE does not access the SSF, so as to the UE may adopt the first mode of the specifications or the improved second mode of the specifications when the UE does not obtain the network parameters from the SSF.

Before initiating a CoD session request, the UE uses the SIP OPTIONS method to initiate a request to the network, requesting network parameter information of a media control channel, such as RTSP, of a network entity (MF in FIG. 7), and/or network parameters of requested contents, and/or description information of a media delivery channel; the network returns network parameter information of a media control channel, and/or network parameters of requested contents, and/or description information of a media delivery channel in a response to the SIP OPTIONS message. Thus, the UE may obtain network parameters of a media control channel, such as RTSP, and information about a media delivery channel before initiating a session request. Therefore, the forgoing first mode may be used to initiate a CoD service request to establish a media control channel and a media delivery channel.

In addition, when the second mode is adopted, after initial negotiation about establishing a media control channel, such as RTSP, a control message needs to be used to obtain information about a media delivery channel, and then a session is set up through SIP. Therefore, the efficiency of this mode is low.

During the initial negotiation about establishing a media control channel in the second mode, the UE may initiate a request by using the SIP OPTIONS method to obtain network parameters of requested contents and/or information about a media delivery channel (through this step, the process in which the UE and the network obtain network parameters of contents and/or information about a media delivery channel through a media control channel is complete) during or after SIP session setup; after the required information is obtained, a media delivery channel is established through the session change process that is described in specifications. In this solution, the step of obtaining network parameters of contents and/or information about a media delivery channel may be performed with the step of negotiating and establishing a media control channel; in the forgoing solution, the two steps are completed in turn. Therefore, the solution is conducive to not only excessive interaction between the UE and multiple network entities during session setup, but also shortening of the entire session setup, including setup of a media control channel and setup of a media delivery channel, time to improve user service experiences.

Figure 8:
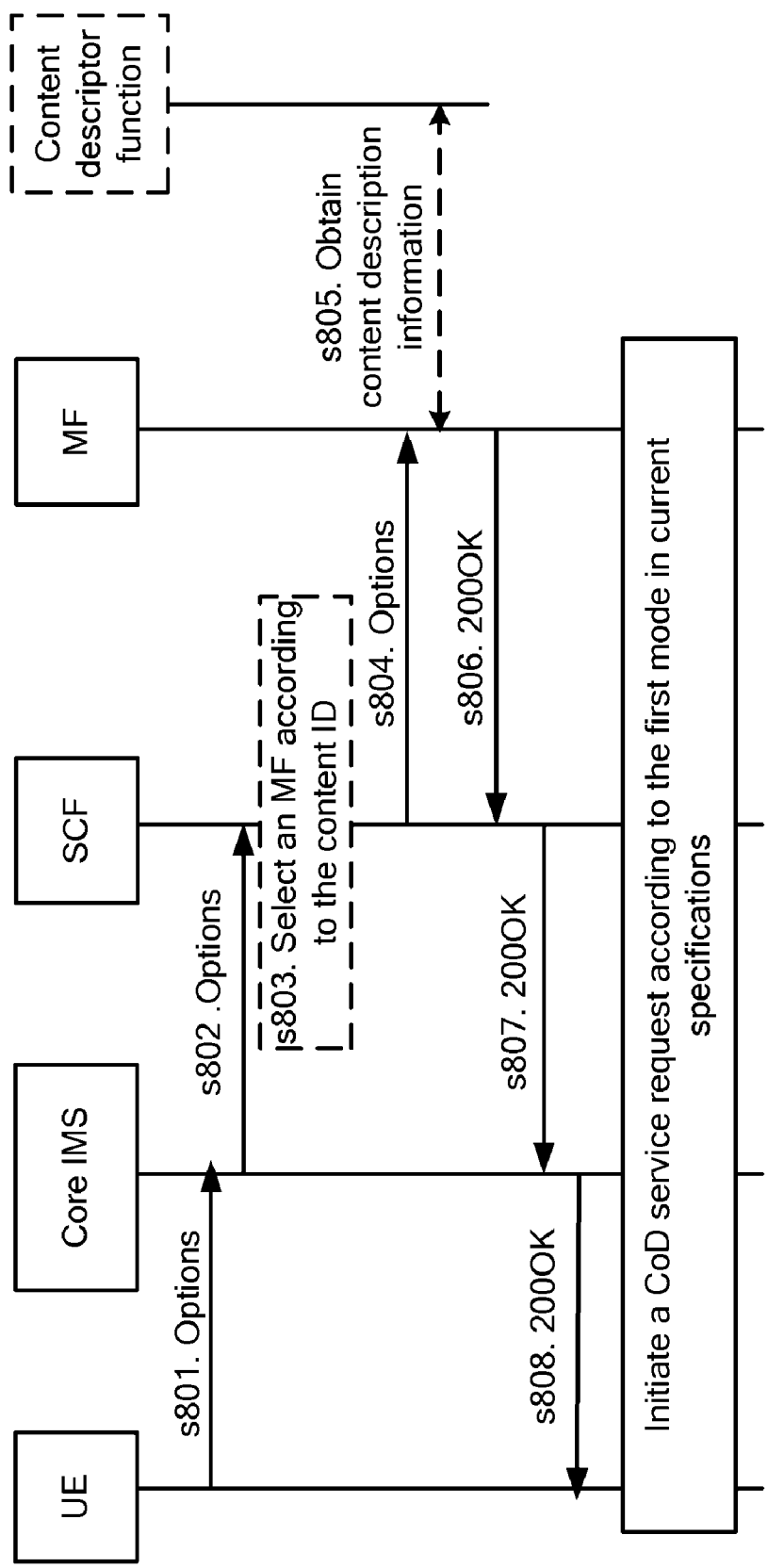
FIG. 8 is a flowchart of a method for obtaining media information before a UE initiates a CoD session request in an eighth embodiment of the present disclosure.

In the eighth embodiment of the present disclosure, before initiating a CoD session request, a UE requests network parameter information of a media control channel and/or network parameters of a media delivery channel. As shown in FIG. 8, the process includes the following steps:

Step S801: Before initiating a CoD session request, a UE initiates a SIP OPTIONS request to a core IMS. The carried message parameters are as follows:

```
OPTIONS sip:XXXMoiveID@XXtele.com SIP/2.0
Via:SIP/2.0/UDP pc33.atlanta.com;branch=z9hG4bKhjhs8ass877
Max-Forwards: 70
To: <sip: XXXMoiveID@XXtele.com >
From: Alice <sip:alice@atlanta.com>;tag=1928301774
Call-ID: a84b4c76e66710
CSeq: 63104 OPTIONS
Contact: <sip:alice@pc33.atlanta.com>
Accept: application/sdp
Content-Length: 0
```

The parameter descriptions of the request in this step serve as an example only. During actual implementation, the description form is not limited to this, and other description forms may be adopted. The message carries the requested CoD identifier, namely, XXXMovieID. In the message, the Accept header field indicates that the type of the received message body is an SDP message. The SDP message may also be an XML message or a message of another type during implementation. To enable the type of the received message body to be an XML message or a message of another type, change "application/sdp" in the Accept header field to "application/xml" or "application/xxx".

Step S802: The core IMS forwards the request to an SCF that provides the CoD service.

Step S803: According to the XXXMovieID, the SCF selects a proper MF. The selection function may be completed on the MF, and the MF selects other proper MFs and forwards the request; alternatively, the selection function is completed on another independent function entity. The specific mode is not a concern of the present disclosure.

Step S804: The SCF forwards the request to the selected MF.

Step S805: According to the XXXMovieID, the MF obtains media description information of contents and network parameter information of a media control channel and/or a media delivery channel from a content descriptor function. The content descriptor function may be a function in the MF or an independent function entity. This step is optional.

Step S806: The MF returns a 200 OK message to the SCF, and the 200 OK message carries the following parameters:

```
SIP/2.0 200 OK
Via: SIP/2.0/UDP pc33.atlanta.com;branch=z9hG4bKhjhs8ass877;
received=192.0.2.4
To: <sip: XXXMoiveID@XXtele.com >;tag=93810874
From: Alice <sip:alice@atlanta.com>;tag=1928301774
Call-ID: a84b4c76e66710
CSeq: 63104 OPTIONS
Contact: <sip: XXXMoiveID@XXtele.com >
Accept: application/sdp
Content-Type: application/sdp
Content-Length: 164
v=0
o=- 2890844256 2890842807 IN IP4 172.16.2.93//Network address information
s=RTSP Session
i=An Example of RTSP Session Usage
a=control:rtsp://foo/twister//Media control session information
t=0 0
m=audio 0 RTP/AVP 0//Audio line media information, such as an audio code
a=control:rtsp://foo/twister/audio
m=video 0 RTP/AVP 26//Video line media information, such as a video code
a=control:rtsp://foo/twister/video
...//Other possible media attribute information
```

The parameter descriptions of the response in the step serve as an example only. During actual implementation, the description form is not limited to this, and other description forms may be adopted. The Accept header field in the request indicates that the type of the received message body is an SDP message, and therefore, the type of the message body in the response is also an SDP message; during actual implementation, the type of the received message body indicated in the Accept header field of the request may also be an XML message or a message of another type, and accordingly, the type of the message body in the response may also be an XML message or a message of another type. To enable the type of the message body to be an XML message or a message of another type, change "application/sdp" in the Content-Type header field to "application/xml" or "application/xxx". The description mode of media control session information may also be another mode that is described in the first embodiment.

In the case of the XML mode, an example of detailed contents of a message body is as follows:

```
<xml description>
    Audio/Video/Text//Media composition
    Codec//Codec of different media
    ...//Other content description information, such as whether
different media components allow independent VCR operations, and
duration
<xml description>
```

Step S807: The SCF returns a 200 OK message to the core IMS.

Step S808: The core IMS returns a 200 OK message to the UE.

After obtaining the media delivery information of the requested contents dynamically, the UE has obtained media information of watched contents from an EPG, such as the media lines, for example, audio, video, and text media lines, of the contents. Then, the first mode defined in current specifications may be adopted; that is, a media control channel and a media deliver channel are established at the same time during initial session setup.

Figure 9:
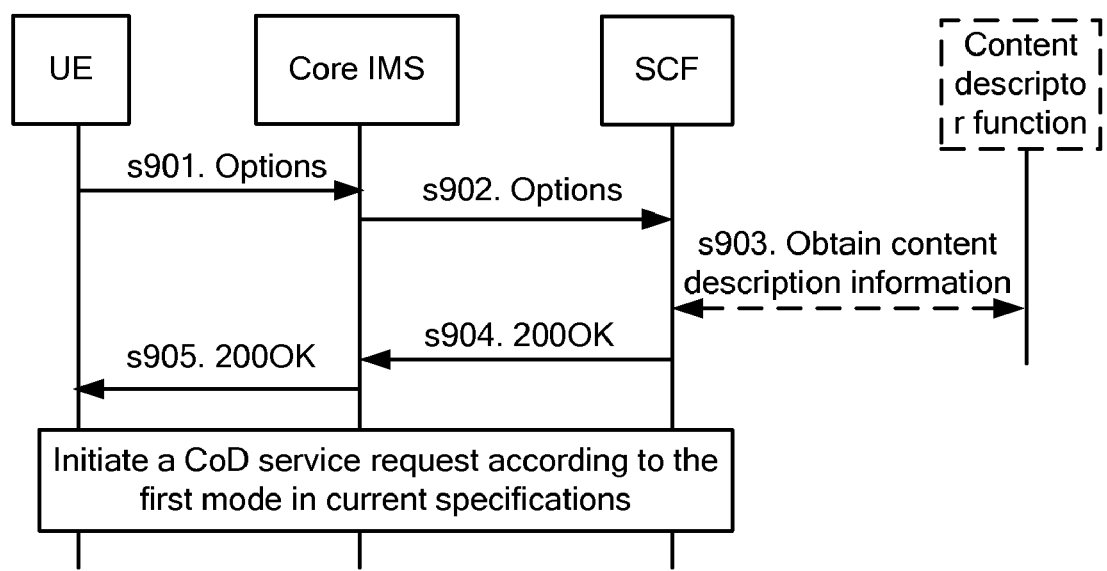
FIG. 9 is a flowchart of another method for obtaining media information before a UE initiates a CoD session request in a ninth embodiment of the present disclosure.

In the ninth embodiment of the present disclosure, before initiating a CoD session request, a UE obtains network parameter information of a media control channel and/or a media delivery channel. As shown in FIG. 9, the process includes the following steps:

Step S901: Before initiating a CoD session request, a UE initiates a SIP OPTIONS request to a core IMS. The carried message parameters are as follows:

```
OPTIONS sip:XXXMoiveID@XXtele.com SIP/2.0
Via: SIP/2.0/UDP pc33.atlanta.com;branch=z9hG4bKhjhs8ass877
Max-Forwards: 70
To: <sip: XXXMoiveID@XXtele.com >
From: Alice <sip:alice@atlanta.com>;tag=1928301774
Call-ID: a84b4c76e66710
CSeq: 63104 OPTIONS
Contact: <sip:alice@pc33.atlanta.com>
Accept: application/xml
Content-Length: 0
```

The parameter descriptions of the request in this step serve as an example only. During actual implementation, the description form is not limited to this, and other description forms may be adopted. The message carries the requested CoD identifier, namely, XXXMovieID. In the message, the Accept header field indicates that the type of the received message body is an XML message. The XML message may also be an SDP message or a message of another type during implementation. To enable the type of the received message body to be an SDP message or a message of another type, change "application/xml" in the Accept header field to "application/sdp" or "application/xxx".

Step S902: The core IMS forwards the request to an SCF that provides the CoD service.

Step S903: According to the XXXMovieID, the SCF obtains media description information of contents and network parameter information of a media control channel and/ or a media delivery channel from a content descriptor function. The content descriptor function may be a function in the SCF or an independent function entity. This step is optional.

Step S904: The SCF returns a 200 OK message to the core IMS, and the 200 OK message carries the following parameters:

```
SIP/2.0 200 OK
Via: SIP/2.0/UDP pc33.atlanta.com;branch=z9hG4bKhjhs8ass877;
received=192.0.2.4
To: <sip: XXXMoiveID@XXtele.com >;tag=93810874
From: Alice <sip:alice@atlanta.com>;tag=1928301774
Call-ID: a84b4c76e66710
CSeq: 63104 OPTIONS
Contact: <sip: XXXMoiveID@XXtele.com >
Accept: application/xml
Content-Type: application/xml
Content-Length: 164
    <xml description>
    Audio/Video/Text//Media composition
        Codec//Codec of different media
        ...//Other content description information, such as whether
``` different media components allow independent VCR operations, and duration
    <xml description>

The parameter descriptions of the response in the step serve as an example only. During actual implementation, the description form is not limited to this, and other description forms may be adopted. The Accept header field in the request indicates that the type of the received message body is an XML message, and therefore, the type of the message body in the response is also an XML message; during actual implementation, the type of the received message body indicated in the Accept header field of the request may also be an SDP message or a message of another type, and accordingly, the type of the message body in the response may also be an SDP message or a message of another type. To enable the type of the message body to be an SDP message or a message of another type, change "application/xml" in the Content-Type header field to "application/sdp" or "application/xxx".

In the case of the SDP mode, an example of detailed contents of a message body is as follows:

```
v=0
m=audio 0 RTP/AVP 0//Audio line media information, such as an audio code
a=control:rtsp://foo/twister/audio
m=video 0 RTP/AVP 26//Video line media information, such as a video code
a=control:rtsp://foo/twister/video
...//Other possible media attribute information
```

The description mode of media control session information may also be another mode that is described in the first embodiment.

Step S905: The core IMS returns a 200 OK message to the UE.

After the UE obtains the network parameters of the media control channel and/or media delivery channel of the requested contents dynamically, the first mode defined in current specifications may be adopted; that is, a media control channel and a content channel are established at the same time during initial session setup.

Figure 10:
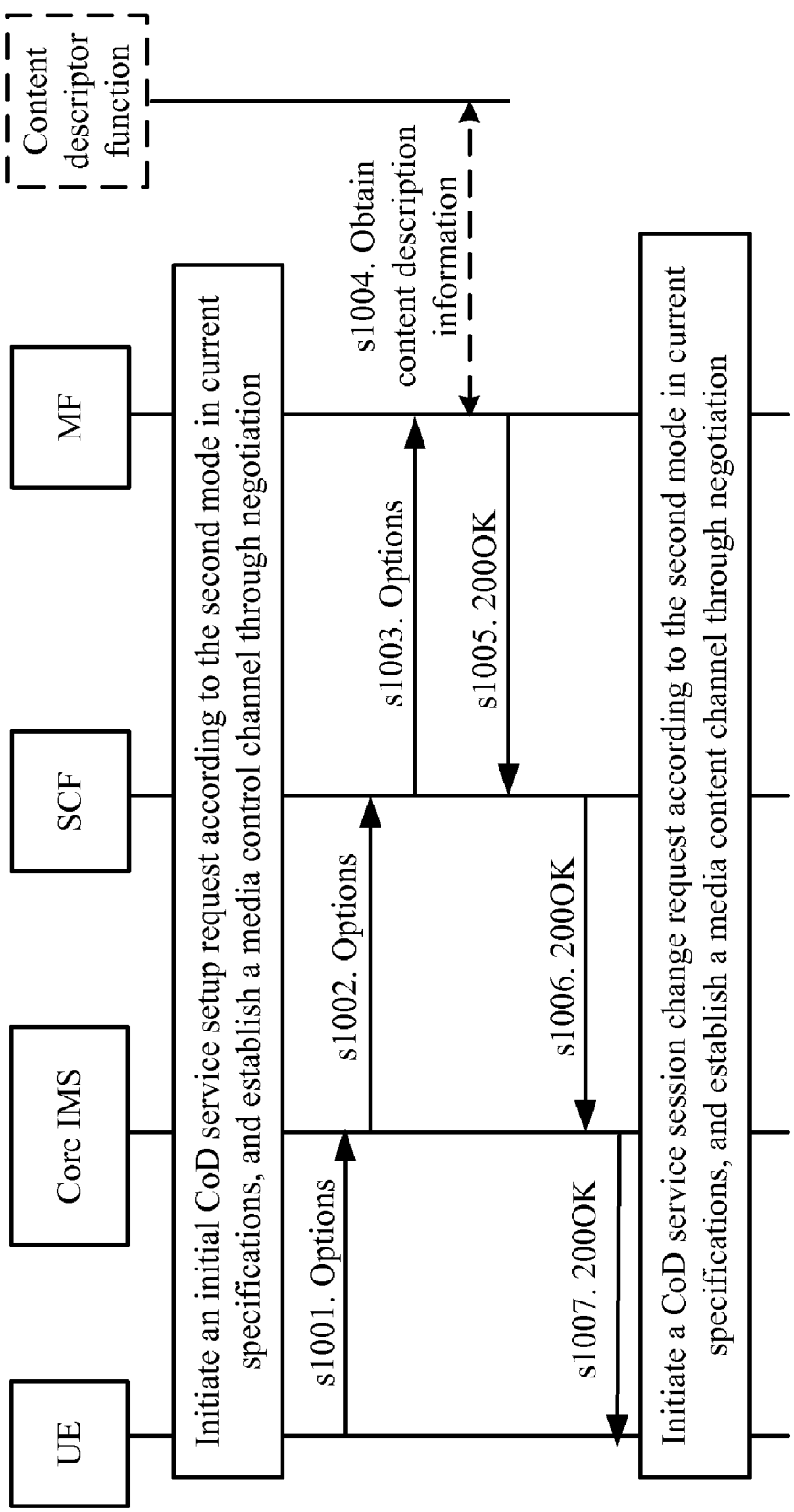
FIG. 10 is a flowchart of a method for obtaining media information when a UE initiates a CoD session request in a tenth embodiment of the present disclosure.

In the tenth embodiment of the present disclosure, a UE requests information about a media delivery channel when initiating a CoD session request. As shown in FIG. 10, the process includes the following steps:

According to the second mode, a UE initiates initial session setup, and negotiates only a media control channel. In this process, the UE may also initiate a process of obtaining information about a media delivery channel. As shown in s1001-s1007 of FIG. 10, and the detailed process is as follows:

Step S1001: A UE initiates a SIP OPTIONS request to a core IMS. The carried message parameters are as follows:

OPTIONS sip:XXXMovieID@XXtele.com SIP/2.0

Via: SIP/2.0/UDPpc33.atlanta.com; branch=z9hG4bKhjhs8ass877//The parameters are the same as the SIP message parameters in the initial session setup process, and the following parameter processing mechanism is similar to the parameter processing mechanism in the initial session setup process:

```
Max-Forwards: 70
To: <sip: XXXMoiveID@XXtele.com >
From: Alice <sip:alice@atlanta.com>;tag=1928301774
Call-ID: a84b4c76e66710
CSeq: 63104 OPTIONS
Contact: <sip:alice@pc33.atlanta.com>
Accept: application/sdp
Content-Length: 0
```

The parameter descriptions of the request in this step serve as an example only. During actual implementation, the description form is not limited to this, and other description forms may be adopted. The message carries the requested CoD identifier, namely, XXXMovieID. In the message, the Accept header field indicates that the type of the received message body is an SDP message. The SDP message may also be an XML message or a message of another type during implementation. To enable the type of the received message body to be an XML message or a message of another type, change "application/sdp" in the Accept header field to "application/xml" or "application/xxx".

Step S1002: The core IMS forwards the request to an SCF that provides the CoD service.

Step S1003: The SCF forwards the request to an MF that is selected during initial session setup.

Step S1004: According to the requested content identifier, namely, XXXMovieID, the MF obtains media description information of contents and/or network parameter information of a media delivery channel from a content descriptor function. The content descriptor function may be a function in the MF or an independent function entity. This step is optional.

Step S1005: The MF returns a 200 OK message to the SCF, and the response carries the following parameters:

```
SIP/2.0 200 OK
Via: SIP/2.0/UDP pc33.atlanta.com;branch=z9hG4bKhjhs8ass877;
received=192.0.2.4
To: <sip: XXXMoiveID@XXtele.com >;tag=93810874
From: Alice <sip:alice@atlanta.com>;tag=1928301774
Call-ID: a84b4c76e66710
CSeq: 63104 OPTIONS
Contact: <sip: XXXMoiveID@XXtele.com >
Accept: application/sdp
Content-Type: application/sdp
Content-Length: 164
v=0
o=- 2890844256 2890842807 IN IP4 172.16.2.93//Network address
information
t=0 0
m=audio 0 RTP/AVP 0//Audio line media information, such as an
audio code
a=control:rtsp://foo/twister/audio
m=video 0 RTP/AVP 26//Video line media information, such as a
video code
a=control:rtsp://foo/twister/video
...//Other possible media attribute information
```

The parameter descriptions of the response in the step serve as an example only. During actual implementation, the description form is not limited to this, and other description forms may be adopted. The Accept header field in the request indicates that the type of the received message body is an SDP message, and therefore, the type of the message body in the response is also an SDP message; during actual implementation, the type of the received message body indicated in the Accept header field of the request may also be an XML message or a message of another type, and accordingly, the type of the message body in the response may also be an XML message or a message of another type. To enable the type of the message body to be an XML message or a message of another type, change "application/sdp" in the Content-Type header field to "application/xml" or "application/xxx". The description mode of media control session information may also be another mode that is described in the first embodiment.

The contents of an XML message are similar to those in the fifth embodiment.

Step S1006: The SCF returns a 200 OK message to the core IMS.

Step S1007: The core IMS returns a 200 OK message to the UE.

After the UE obtains the media delivery channel information of requested contents, the session change process defined in current specifications is used to negotiate and establish a media delivery channel, and this is different from the original process in which after a media control channel is established and the media delivery channel information of requested contents is obtained by interaction of the media control channel, a session change process is initiated to establish a media delivery channel. Thus, the CoD session setup process is improved.

In this embodiment, the SIP OPTIONS message is sent to the MF for processing, and the information about a media delivery channel is returned. The SIP OPTIONS message may also be processed by the SCF, and the processing mode is similar to that in the sixth embodiment.

Figure 11:
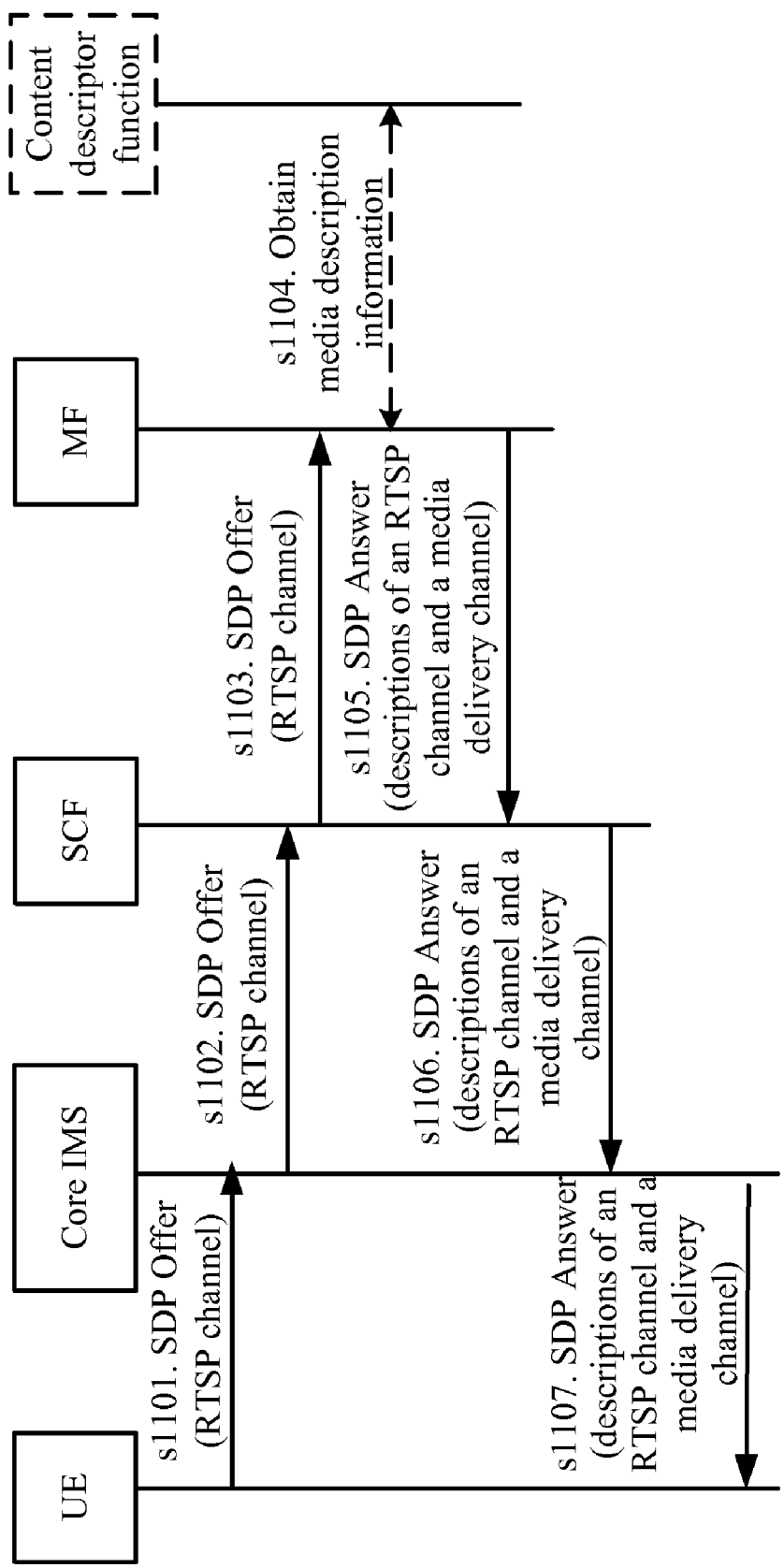
FIG. 11 is a flowchart of another method for obtaining media information when a UE initiates a CoD session request in an eleventh embodiment of the present disclosure.

In the eleventh embodiment of the present disclosure, a UE initiates a CoD service request, and the information about negotiating a media control channel is carried in an SDP Offer; an MF returns an SDP Answer that carries media description information of a content delivery channel in XML or link mode to the UE after obtaining the media description information of a content delivery channel. As shown in FIG. 11, the process includes the following steps:

Step S1101: A UE initiates a CoD service request that carries a content identifier and an SDP Offer to a core IMS. The service request may be a SIP INVITE message or other requests.

Step S1102: The core IMS forwards the CoD service request to an SCF.

Step S1103: The SCF selects a proper MF through the content identifier, and then sends the SDP Offer to the MF.

Step S1104: The MF obtains media description information of the content delivery channel corresponding to the content identifier from a content descriptor function. The content descriptor function may work as an internal function module of the MF or an independent function entity. This step is optional.

Steps S1105-S1107: According to the obtained media description information of a content delivery channel, the MF generates a corresponding SDP Answer that carries the media description information of a content delivery channel in XML or link mode, in a returned service response for example, a 200 OK message, a 183 request or another message. The XML descriptions are similar to those in the foregoing embodiment.

After the UE obtains the media delivery channel information of requested contents, the session change process defined in current specifications is used to negotiate and establish a media delivery channel, and this is different from the original process in which after a media control channel is established and the media delivery channel information of requested contents is obtained by interaction of the media control channel, a session change process is initiated to establish a media delivery channel. Thus, the CoD session setup process is improved.

In this embodiment, the request such as a SIP INVITE message is sent to the MF for processing, and the MF returns media description information of a content delivery channel in a response in XML or link mode after a query operation; alternatively, the MF returns a response to the SCF, and the SCF returns media description information of a content delivery channel in the response in XML or link mode after a query operation, and this processing mode is similar to that in the sixth embodiment.

The eighth, ninth, tenth, and eleventh embodiments are typical examples in several scenarios. Because of application flexibility of SIP, the foregoing use modes may be applied in multiple scenarios. In addition, according to the specific capability information indicated in an extended Accept header field, specific description information of contents is obtained; for example, SIP has defined Accept-Encoding and Accept-Language to indicate the code type and language of media respectively. A technical solution of the present disclosure uses a SIP OPTIONS method (in SIP, the method is to obtain capability information); the technical solution may also use another SIP method, such as the Subscribe/Notify mode or Refer mode. The SIP method complies with SIP specifications, and the application method is similar to an embodiment of the present disclosure.

An optional method is as follows: An SDP Offer carried in an initial session request, such as an Invite message, of the UE is null (in this case, the UE does not obtain network parameters and may not initiate a valid SDP Offer); an SDP Answer in a response returned by a network entity, for example, SCF or MF, is also null; and the response carries the description information of a media control channel and/or a media delivery channel of the requested content identifier, and network parameters. The description may be an description in an XML language in a SIP message body, or is an address link or SDP description information of a media control channel and/or a media delivery channel of requested contents and/or information about network parameters.

Figure 12:
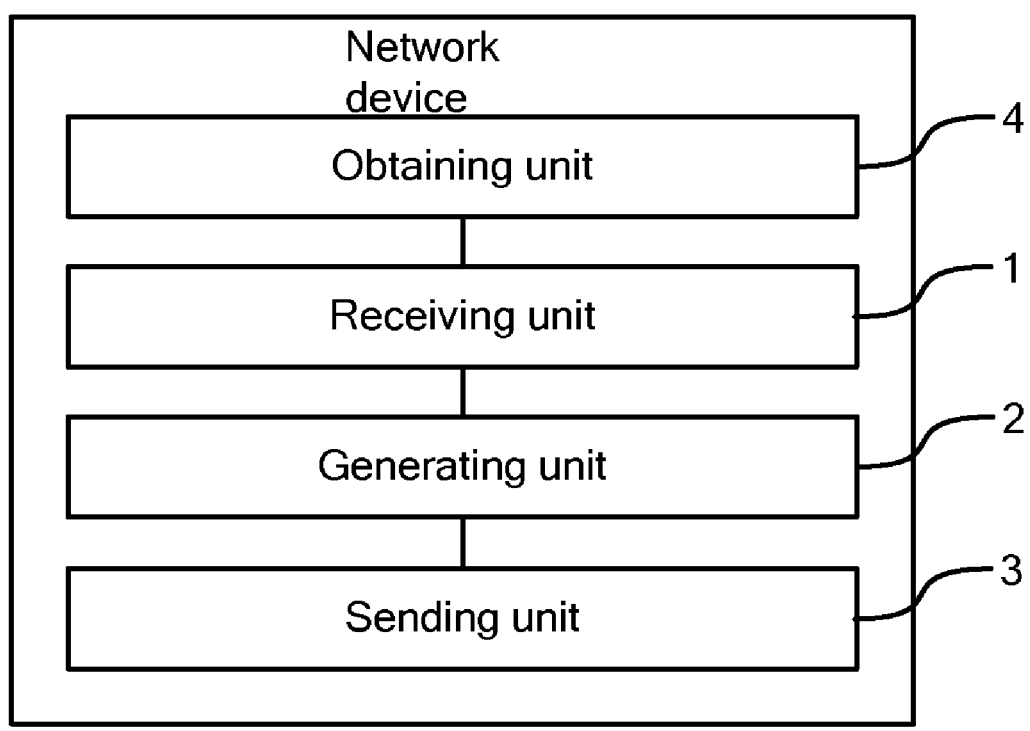
FIG. 12 is a structure of a network device in a twelfth embodiment of the present disclosure.
Figure 13:
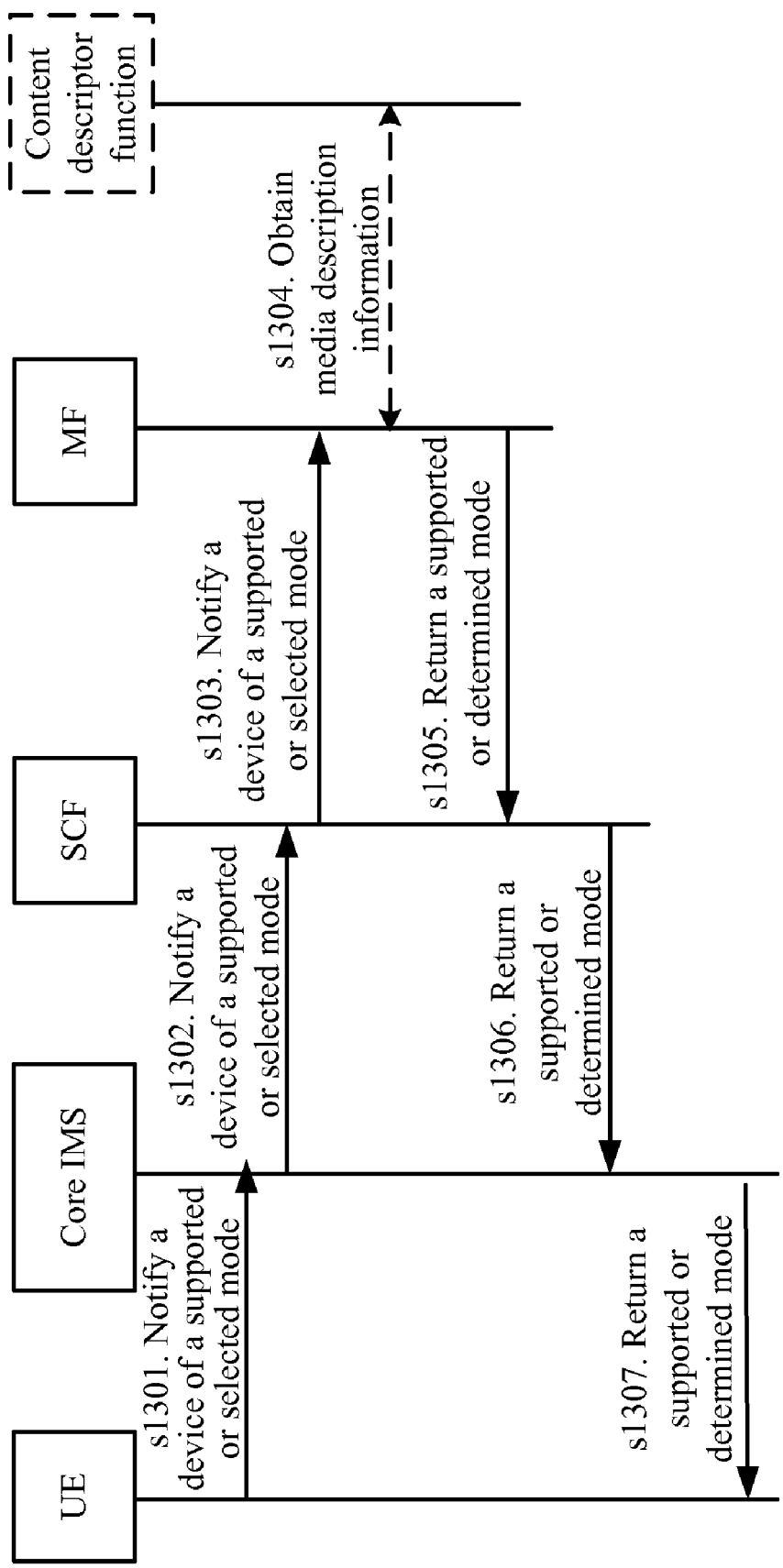
FIG. 13 is a flowchart in which a UE and a network entity determine a finally used control mode through negotiation in a thirteenth embodiment of the present disclosure.

According to the method for obtaining media description information of IPTV services in the foregoing eighth, ninth, tenth, and eleventh embodiments of the present disclosure, the twelfth embodiment of the present disclosure provides a network device. As shown in FIG. 12, the device includes:

a receiving unit 1, configured to receive a SIP request for obtaining media description information, where the SIP request is sent by a UE through a core IMS and carries a content identifier;

a generating unit 2, configured to generate a response in which SDP carries the media description information corresponding to the content identifier; and a sending unit 3, configured to send the response to the UE through the core IMS.

The network device further includes:

an obtaining unit 4, configured to obtain media description information from a content descriptor function.

The network device in this embodiment is an SCF, an MF or other network entities that may implement the foregoing functions of the network device; the variation of specific entities does not affect the scope of protection of the present disclosure.

The thirteenth embodiment of the present disclosure describes negotiation about a control mode during session setup. A UE may negotiate a supported control mode, such as a synchronous control mode and a separate control mode, for different media with the network during session setup. The following embodiment takes an MF as an example, and during actual implementation, other network entities may also be used during session setup. The UE may select its desired or supported mode and notify the mode to the MF; according to its supported mode, the MF determines the finally used control mode. The specific control mode may be any mode in the foregoing first embodiment. An embodiment of the mode in the IMS is as follows:

Step S1301: A UE notifies a core IMS of a supported or selected mode of the UE for different media. The UE notifies an MF of its supported mode that may be a synchronous control mode and/or a separate control mode. Alternatively, the UE may notify the MF of the preferred mode of the UE, such as a separate control mode or a synchronous control mode. During actual implementation, the UE may notify the MF through a service request (for example, SIP INVITE message), or an OPTIONS message. Specifically, a control mode may be carried in a SIP header field or an SDP attribute line of a message body.

(1) When the control mode is carried in a SIP header field, the control mode may be embodied by a UE capability or a mode preferred by the UE. For example, the control mode is carried in a Contact header field, a Request-Disposition header field, an Accept-Contact header field or a Reject-Contact header field.

a. In the case of the Contact header field:
Contact: <sip:user@host.example.com>; ControlMode="aggregate"
b. In the case of the Request-Disposition header field:
Request-Disposition: aggregate
"ControlMode" may be specified, and the value may be "aggregate" or "non-aggregate".

The method for carrying a control mode in the Accept-Contact or Reject-Contact header field is similar to the method for carrying a control mode in the Request-Disposition header field.

"ControlMode" serves as only an example, and other character strings may be used.

(2) The control mode may also be carried in a SIP message body. When the SIP message body uses an SDP message, the control mode may be carried in an attribute line, namely, "a=<attribute>:<value>".

"attribute" identifies a media control mode attribute, which may be a character set or others; "value" identifies a control mode, which may be a character set, a number, a token or others.

The attribute line may be placed at a session level or media level. A control mode attribute line under the media line of a media control channel, such as RTSP, is as follows:

```
......
m=video 3400 RTP/AVP 98
......
m=audio 3456 RTP/AVP 97
......
m=application 10000 TCP/RTSP iptv_rtsp
......
a=ControlMode:aggregate//Control mode attribute line
```

Alternatively, an "a=fmtp" attribute line may be used, for example,
a=fmtp:rtsp ControlMode:aggregate
The foregoing SDP attribute line indicates that the UE supports negotiation in synchronous control mode and separate control mode. In addition, the negotiation is expected to adopt the synchronous control mode.

In embodiments of the present disclosure, the UE and the MF negotiate with each other about whether they or the other party supports the synchronous control mode and the separate control mode, and the desired modes of them. To implement this idea, other construction modes of attribute lines may be used in addition to the forgoing mode and covered in the scope of protection of the present disclosure.

a=aggregate-control:TRUE/False or
a=fmtp:rtsp aggregate-control TRUE/False

Steps S1302-S1303: The UE sends a request to an MF through the core IMS and an SCF.

Step S1304: According to the requested content identifier, namely, XXXMovieID, the MF obtains media description information of contents and/or network parameter information of a media control channel and a media delivery channel from a content descriptor function. The content descriptor function may be a function in the MF or an independent function entity. This step is optional.

Step S1305: The MF returns a supported or determined mode.

The MF returns a response to notify the UE of the supported or selected control mode of the MF.

Corresponding to step S1301, during actual implementation, the response may be carried in the SIP header field of a response such as a 200 OK or 183 message, or carried in an SDP attribute line of a message body.

When the message is carried in the SIP header field, the method is similar to the method of step S1301.

An example in which the message is carried in an SDP attribute line of a message body is as follows: In addition to the specific mode selected by the MF, the MF further carries the parameters of the related mode, such as the URL and session identifier of the control mode.

--- m=video 3400 RTP/AVP 98
......
m=audio 3456 RTP/AVP 97
......
m=application 10000 TCP/RTSP iptv_rtsp
......
a=ControlMode:aggregate //or a=fmtp:ControlMode aggregate
a=fmtp:iptv_rtsp h-uri=rtsp:// MCF.example.com /video-position
a=fmtp:iptv_rtsp h-session: 123456
a=m-stream:1, 2

---

In separate mode, information about multiple parameters is returned.

--- m=video 3400 RTP/AVP 98
......
m=audio 3456 RTP/AVP 97
......
m=application 10000 TCP/RTSP iptv_rtsp
......
a=ControlMode:non-aggregate//or a=fmtp:ControlMode non-aggregate
a=fmtp:iptv_rtsp h-uri=rtsp:// MCF.example.com /video-position/video1
a=fmtp:rtsp h-session: 123456
a= m-stream:1
a=fmtp:iptv_rtsp h-uri=rtsp:// MCF.example.com /audio-position/audio1
a=fmtp:rtsp h-session: 234567
a= m-stream:2

---

The above describes a control relation between a media control channel and a media delivery channel. That is, a media control attribute line may adopt any mode described in the first embodiment.

Steps S1306-S1307: The MF sends a response to the UE through the SCF and the core IMS.

In this embodiment, the request such as a SIP INVITE message or an OPTIONS message is sent to the MF for processing, and the MF returns a supported control mode in a response after a query operation; alternatively, the MF may return a response to the SCF, and the SCF returns a supported control mode in the response after a query operation, and this processing mode is similar to that in the third embodiment.

Through the preceding description of embodiments of the present disclosure, it is understandable to those skilled in the art that embodiments of the present disclosure may be implemented by hardware or by software in combination with a necessary hardware platform. Thus, the technical solution of the present disclosure may be made into software. The software may be stored in a non-volatile storage medium, for example, CD-ROM, USB disk, or mobile hard disk, and include several instructions that instruct a computer device, for example, personal computer, server or network device, to perform the methods provided in each embodiment of the present disclosure.

Although the present disclosure has been described through several exemplary embodiments, the disclosure is not limited to such embodiments. It is apparent that those skilled in the art can make various modifications and variations to the disclosure without departing from the scope of the disclosure. The disclosure is intended to cover the modifications and variations provided that they fall in the scope of protection defined by the following claims or their equivalents.

What is claimed is:

1. In a network device, a method for obtaining media description information of Internet Protocol Television (IPTV) services that is used to create a media session that uses multiple media delivery channels for delivering multiple media streams of media content and one or more media control channels for controlling playback operations for consuming the media content, the method comprising:

receiving, a Session Initiation Protocol (SIP) request for obtaining media description information of a plurality of different media channels corresponding to a plurality of media delivery streams for a single media content, wherein the SIP request is sent by a User Equipment (UE) through a core IP Multimedia Subsystem (IMS) and carries a content identifier;

sending, a SIP response that carries the media description information corresponding to the content identifier to the UE through the core IMS, wherein the media description information includes one or more attributes to describe the relation between one or more media control channels and the plurality of media delivery channels corresponding to the plurality of media delivery streams; and wherein the media description information indicates a control state of each of the plurality of media streams, and wherein the control state is one of synchronous control, separate control, or a hybrid of synchronous control and separate control for the plurality of media streams.

2. The method of claim 1, wherein before the network device sends the response that carries the media description information corresponding to the content identifier, the method further comprises:

obtaining, by the network device, the media description information from a content descriptor function.

3. The method of claim 1, wherein the network device is a Service Control Function (SCF).

4. The method of claim 1, wherein the network device is a Media Function (MF).

5. The method of claim 1, wherein the SIP request for obtaining the media description information is an OPTIONS message.

6. The method of claim 1, wherein the SIP request for obtaining the media description information is an INVITE message.

7. The method of claim 1, wherein the media description information is carried in the response in Session Description Protocol (SDP) mode.

8. The method of claim 1, wherein the media description information is carried in the response in Extensible Markup Language (XML) mode.

9. The method of claim 1, wherein the plurality of media streams includes an audio media stream and a video media stream for the media content.

10. The method of claim 9, wherein the plurality of media streams further includes a text media stream for the media content.

11. A network device that is used to create a media session that uses multiple media delivery channels for delivering multiple media streams of media content and one or more media control channels for controlling playback operations for consuming the media content, comprising:
   a receiving unit, configured to receive a Session Initiation Protocol (SIP) request for obtaining media description information of a plurality of different media channels corresponding to a plurality of media delivery streams for a single media content, wherein the SIP request is sent by a User Equipment (UE) through a core IP Multimedia Subsystem (IMS) and carries a content identifier;
   a generating unit, configured to generate a response in which a Session Description Protocol (SDP) carries the media description information corresponding to the content identifier, and wherein the media description information includes one or more attributes to describe the relation between one or more media control channels and the plurality of media delivery channels corresponding to the plurality of media delivery streams;
   a sending unit, configured to send the response to the UE through the core IMS; and
   wherein the media description information indicates a control state of each of the plurality of media streams, and wherein the control state is one of synchronous control, separate control, or a hybrid of synchronous control and separate control for the plurality of media streams.

12. The network device of claim 11, further comprising: an obtaining unit, configured to obtain the media description information from a content descriptor function.

13. The network device of claim 11, wherein the network device is a Service Control Function (SCF).

14. The network device of claim 11, wherein the network device is a Media Function (MF).

15. The network device of claim 11, wherein the plurality of media streams includes an audio media stream and a video media stream for the media content.

16. The network device of claim 15, wherein the plurality of media streams further includes a text media stream for the media content.

* * * * *